(12) United States Patent
Cunningham et al.

(10) Patent No.: US 11,367,139 B2
(45) Date of Patent: Jun. 21, 2022

(54) PERFORMANCE MEASUREMENT AND REPORTING FOR GUARANTEED INCOME FINANCIAL PRODUCTS AND SERVICES

(71) Applicant: Tangram Solutions LLC, Evanston, IL (US)

(72) Inventors: David S. Cunningham, Chicago, IL (US); Raja M. Iqbal, Naperville, IL (US); Chetan G. Jadhav, Summit, NJ (US); Milind M. Lele, Evanston, IL (US)

(73) Assignee: Tangram Solutions LLC, Evanston, IL (US)

( * ) Notice: Subject to any disclaimer, the term of this patent is extended or adjusted under 35 U.S.C. 154(b) by 17 days.

(21) Appl. No.: 16/742,555

(22) Filed: Jan. 14, 2020

(65) Prior Publication Data
US 2020/0265520 A1 Aug. 20, 2020

Related U.S. Application Data

(60) Provisional application No. 62/792,653, filed on Jan. 15, 2019.

(51) Int. Cl.
*G06Q 40/06* (2012.01)
*G06Q 10/06* (2012.01)
(Continued)

(52) U.S. Cl.
CPC .......... *G06Q 40/06* (2013.01); *G06F 40/221* (2020.01); *G06N 7/005* (2013.01); *G06Q 10/04* (2013.01);
(Continued)

(58) Field of Classification Search
CPC ...... G06Q 40/06; G06Q 10/067; G06Q 10/04; G06Q 50/186; G06F 40/221; G06N 7/005; G06N 5/045; G06N 20/00
See application file for complete search history.

(56) References Cited

U.S. PATENT DOCUMENTS 7,822,769 B2 * 10/2010 Rohan .................... G06Q 90/00
7,856,388 B1 * 12/2010 Srivastava ............. G06Q 40/00
705/36 R
(Continued)

FOREIGN PATENT DOCUMENTS

WO     WO-2010111328 A1 * 9/2010 ............. G06Q 10/06

OTHER PUBLICATIONS

Fielding, Ray T.: Chapter 5: Representational State Transfer (REST), 2000, pp. 1-17 (Year: 2000).*
(Continued)

*Primary Examiner* — Bijendra K Shrestha
(74) *Attorney, Agent, or Firm* — Cameron LLP

(57) ABSTRACT

A method and apparatus for acquiring and parsing data into categories responsive to receipt of at least one prospectus of a variable or non-fixed annuity contract for storage in an annuity master database. Once annuity contract data is received in the annuity master database, the data is analyzed and a recommended annuity contract value is forecast using one of trend-line projection and Monte Carlo simulation. A result is a filtering and listing of at least one recommended annuity or, further, a ranking of annuity contracts available from various carriers recommended for an annuity contract purchaser responsive to an annuity contract purchaser profile.

8 Claims, 41 Drawing Sheets

(51) Int. Cl.
*G06F 40/221* (2020.01)
*G06Q 10/04* (2012.01)
*G06N 7/00* (2006.01)
*G06Q 50/18* (2012.01)

(52) U.S. Cl.
CPC ......... *G06Q 10/067* (2013.01); *G06Q 50/186* (2013.01)

(56) References Cited

U.S. PATENT DOCUMENTS

| | | | | |
|---|---|---|---|---|
| 8,209,197 B2* | 6/2012 | Tatro | ............... | G06Q 40/08 705/4 |
| 8,473,392 B1* | 6/2013 | Hinchey | ............... | G06Q 40/06 705/35 |
| 2003/0041077 A1* | 2/2003 | Davis | ............... | G06F 40/143 715/205 |
| 2008/0046874 A1* | 2/2008 | Kostoulas | ............... | G06F 8/427 717/143 |
| 2012/0185373 A1* | 7/2012 | Grody | ............... | G06Q 40/04 705/37 |
| 2013/0097705 A1* | 4/2013 | Montoro | ............... | G06F 21/562 726/24 |
| 2013/0198093 A1* | 8/2013 | Taylor, III | ............... | G06F 16/9535 705/311 |
| 2019/0377781 A1* | 12/2019 | Davis | ............... | G06F 3/0482 |

OTHER PUBLICATIONS

Bauer et al.: A Universal Pricing Framework for Guaranteed Minimum Benefits in Variable Annuities, Apr. 17, 2015, Cambridge University Press, pp. 1-31. (Year: 2015).*

XBRL International, Inc.: Notes on the Processing of Large XBRL Instances 1.0, 2012, pp. 1-10 (Year: 2012).*

CFA Institute: eXtensible Business Reporting Language, 2009, pp. 1-28 (Year: 2009).*

\* cited by examiner

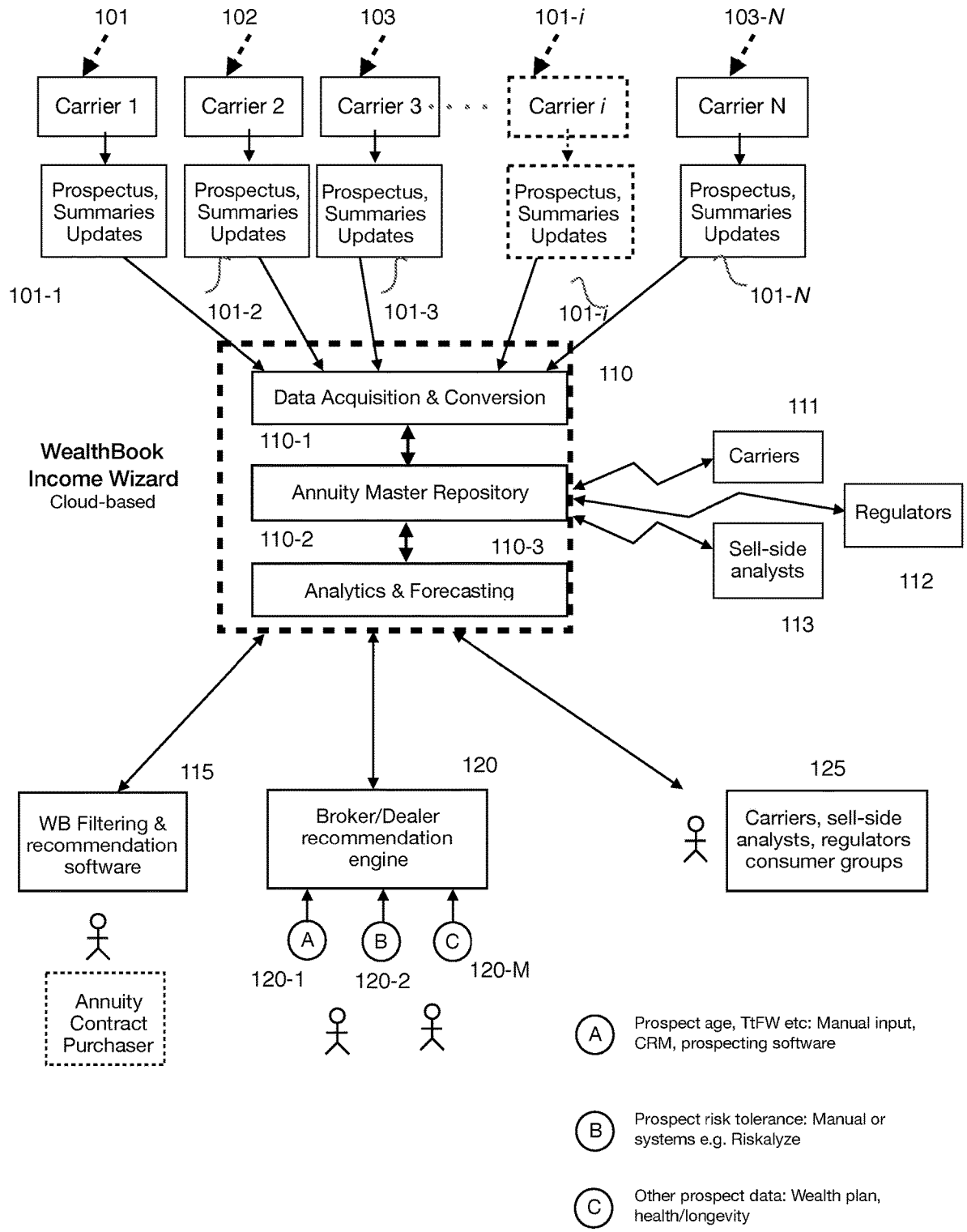
FIG. 1A: Overview

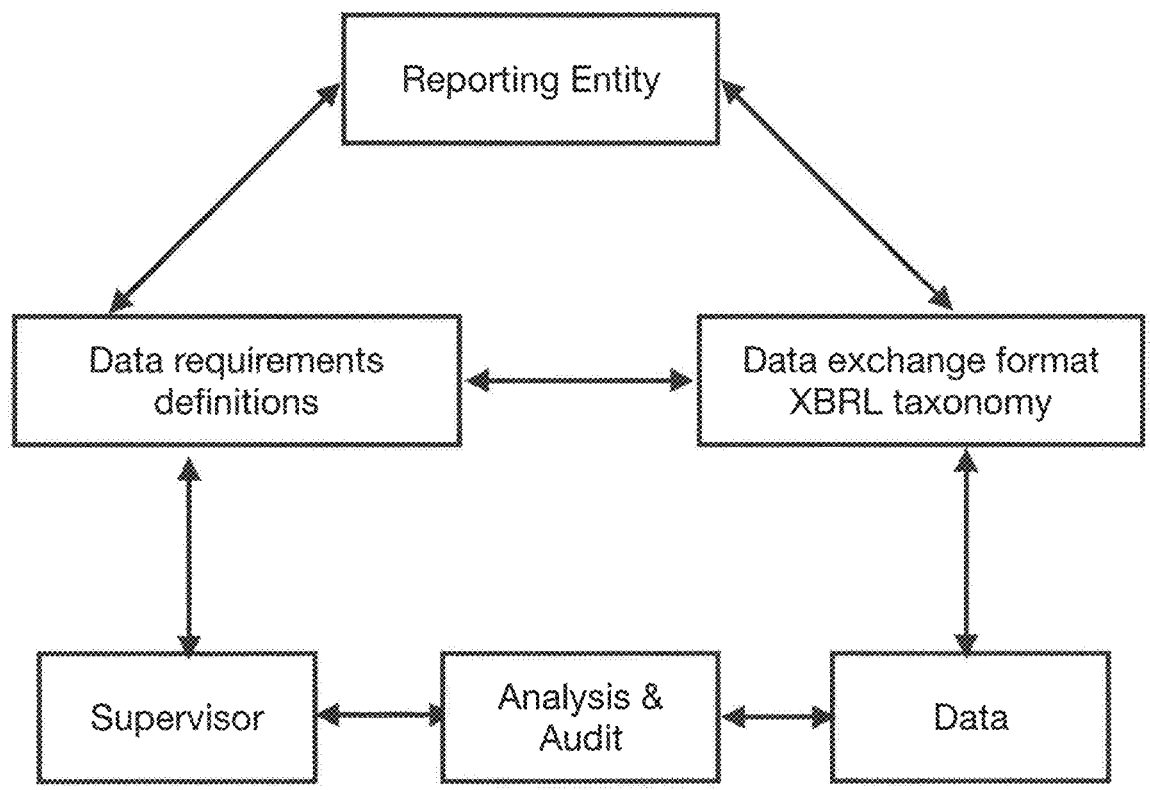
FIG. 1B: Data Model

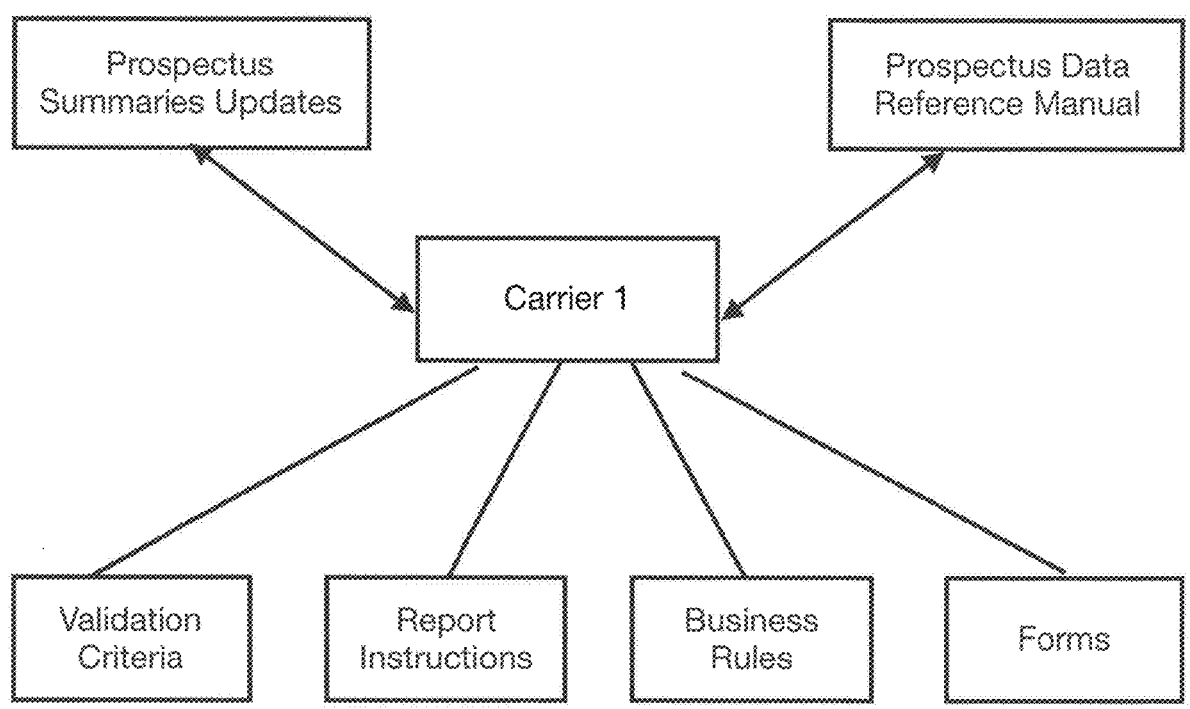
FIG. 1C: Reporting Entity

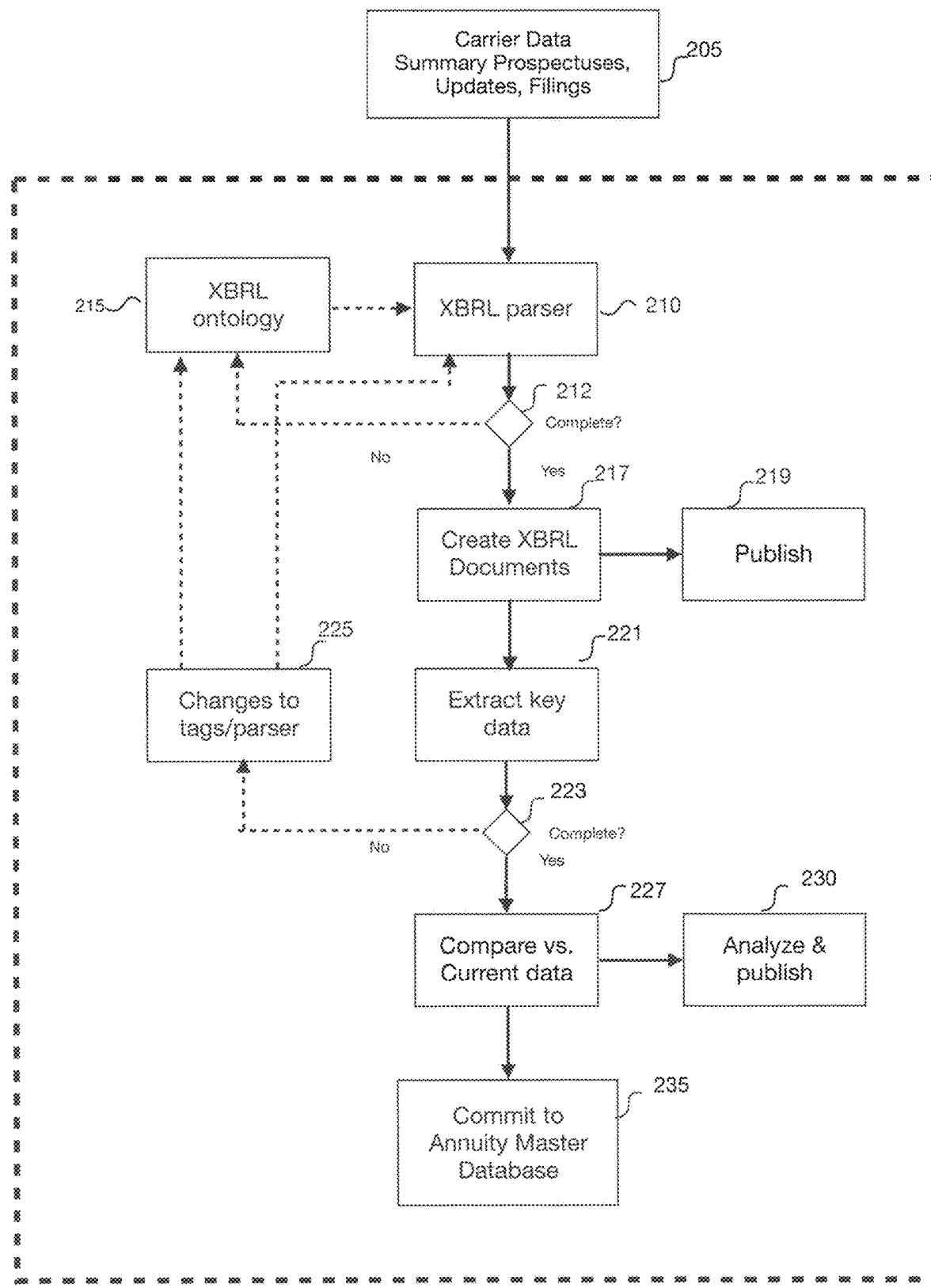
FIG. 2 A — Data Acquisition & Conversion

FIG. 2 D

| | |
|---|---|
| XBRL-Specification | These are rules to govern creation of XBRL-compliant files and conformance to the specification. |
| XBRL-Taxonomy | A collection of financial prospectus data facts for a certain period of time for a reporting entity. By purpose, industry, and jurisdiction. |
| Schema and Linkbases | Schema: dictionary of prospectus data terms, and Linkbases: set of links to manage references, labels and relationships |
| XBRL-Instance | It is an Output from tagging data using one or more taxonomies |
| XSL - Style Sheet | It is a presentation layer or transformation of tagged data |
| Set of one or more than one taxonomies | The framework can be composed of one or many taxonomies |

FIG. 2 E

XBRL Detail Concepts

- XBRL Taxonomies
  - Defines a set of prospectus data report concepts that can be used in the exchange of insurance carrier information. The concept types are further defined in an XSD file.

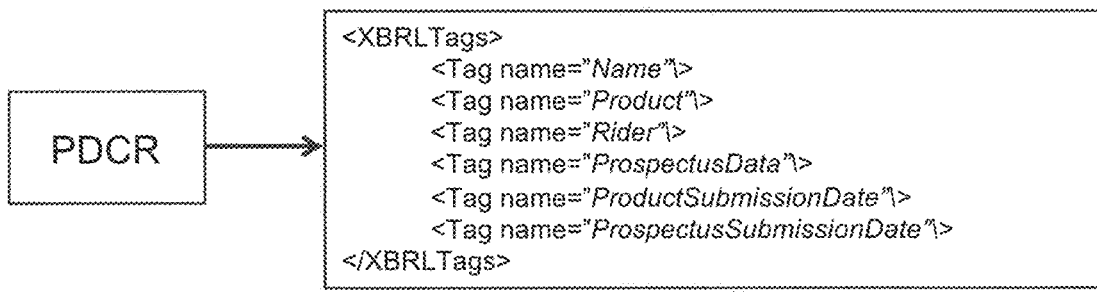

```
<XBRLTags>
    <Tag name="Name"\>
    <Tag name="Product"\>
    <Tag name="Rider"\>
    <Tag name="ProspectusData"\>
    <Tag name="ProductSubmissionDate"\>
    <Tag name="ProspectusSubmissionDate"\>
</XBRLTags>
```

PDCR →

Detail Concepts of XBRL

- Instructions
  - The Instructions are associated with each XBRL tag element that is defined.

```
<Instructions>
    <Instruction tag="Name">
        Enter the carrier name
    </Instruction>
    <Instruction tag="Product">
        Enter the product name of current time period
    </Instruction>
    <Instruction tag="Rider">
        Enter the Rider name of current time period
    </Instruction>
    <Instruction tag="ProspectData">
        Enter the Rider name of current time period
    </Instruction>
    <Instruction tag="ProductSubmissionDate">
        Enter the product submission data
    </Instruction>
    <Instruction tag=" ProspectusSubmissionDate">
        Enter the prospectus submission data
    </Instruction>
</Instructions>
```

FIG. 2 F1

Detail Concepts XBRL

- Business Rules
  - Business Rules can be defined for prospectus data reports and forms by using a syntax language that refers to XBRL tags and predefined functions.
    examples of functions, validations, or edits could be:
    - Name Not Null
    - ProductSubmissionData > PREVIOUS(ProductSubmissionDate)

```
<Validations>
    <Validate tag="Name" function="MustExist(Name)"
        error="Name must exist"/>
    <Validate tag=" ProductSubmissionData"
function="PREV(ProductSubmissionData) < ProductSubmissionData"
error="ProductSubmissionData must be greater than existing product submission
date"/>
</Validations>
```

FIG. 2 F2

XBRL Detail Concepts

- Instance files
  - The Instance files contain data for a business form or report.

```
<InstanceData>
    <Data tag="Name" value="Nationwide"/>
    <Data tag="Product" value="ForeIncForeIncome II">
    <Data tag="Rider" value=" Guaranteed Income Builder Benefit" />
    <Data tag="Period" value="2018-03-31" />
    <Data tag="ProspectusSubmissionDate" value="2018-01-01" />
</InstanceData>
```

FLOWCHART

SINGLE CARRIER DATA SOURCE

FIG. 2J: FLOWCHART
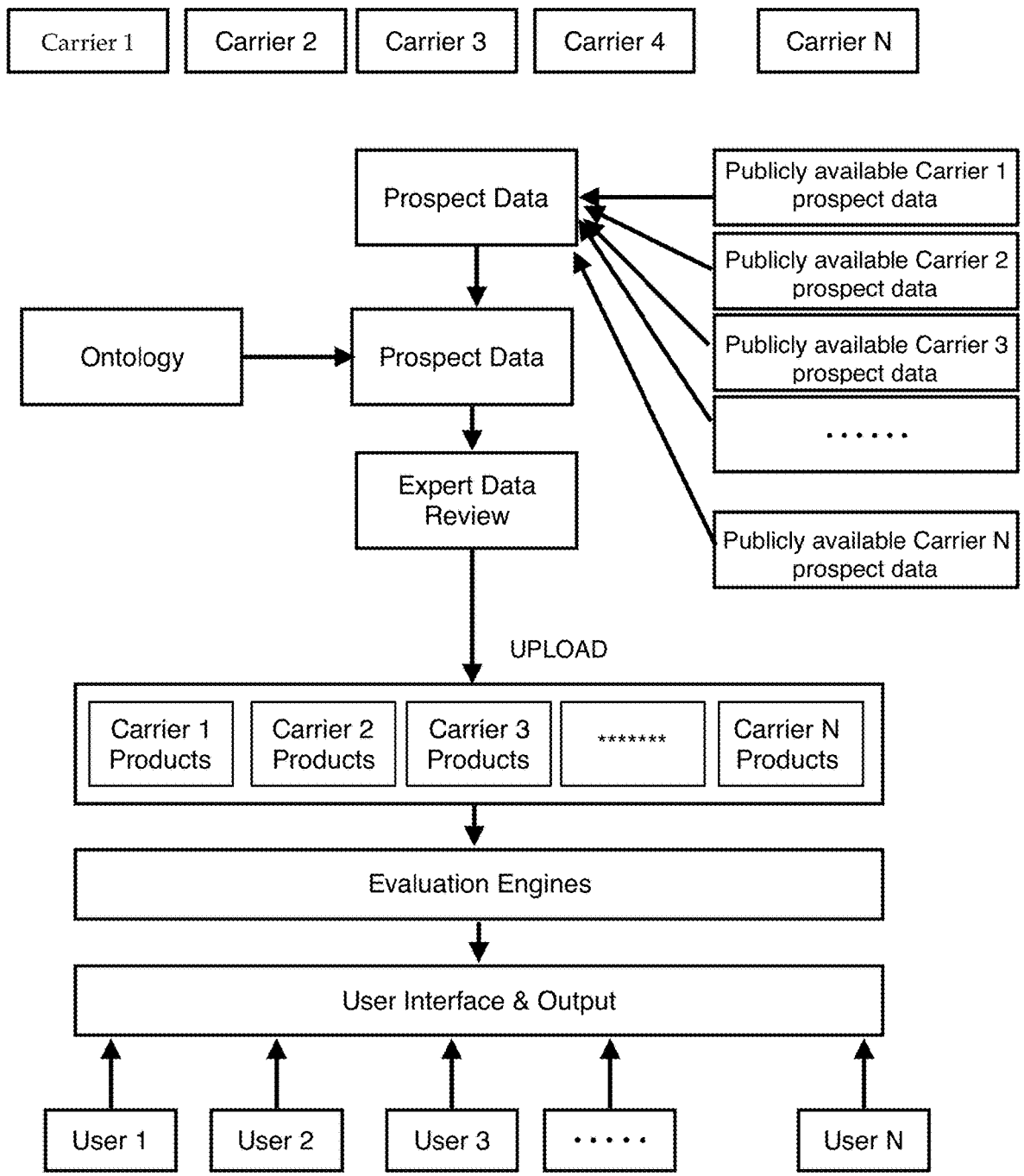

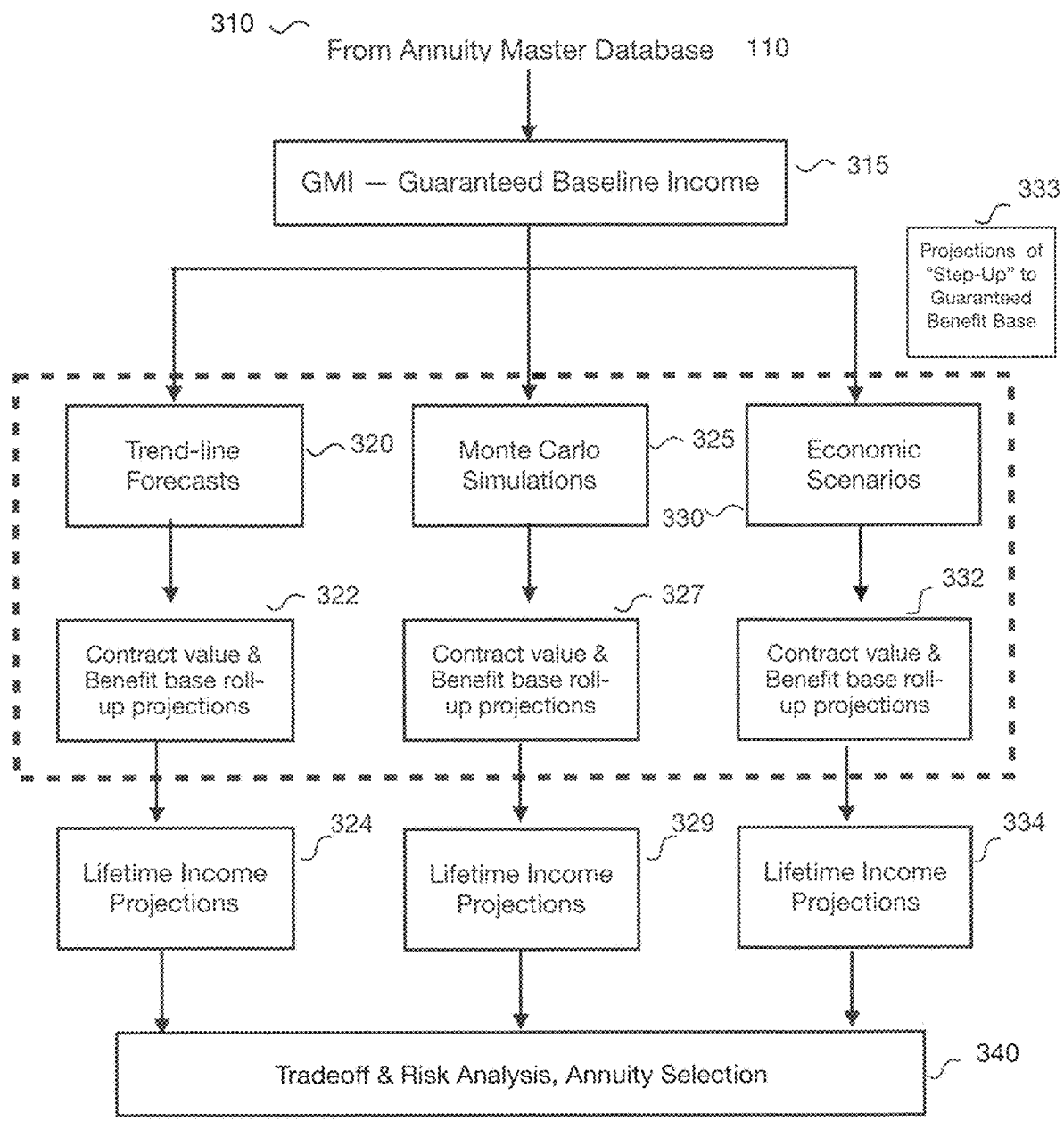

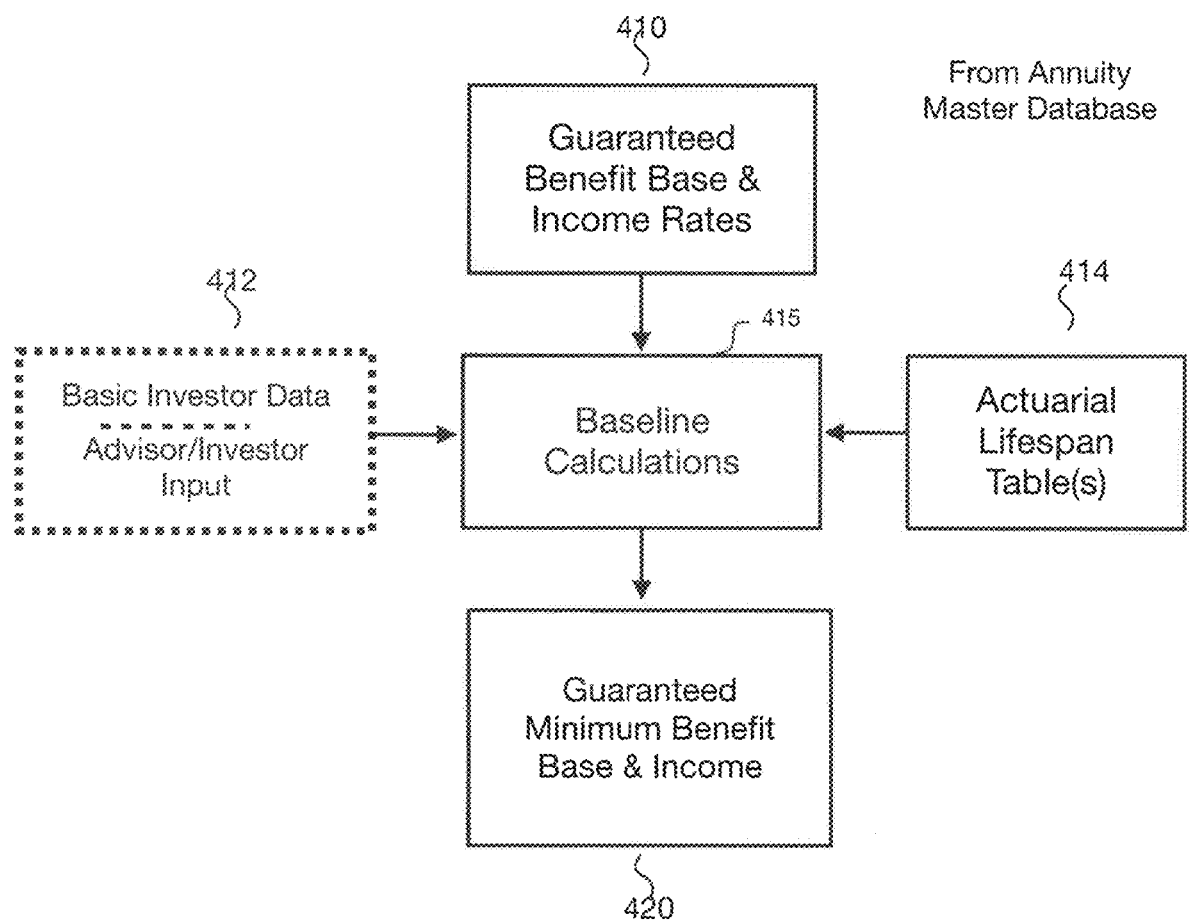

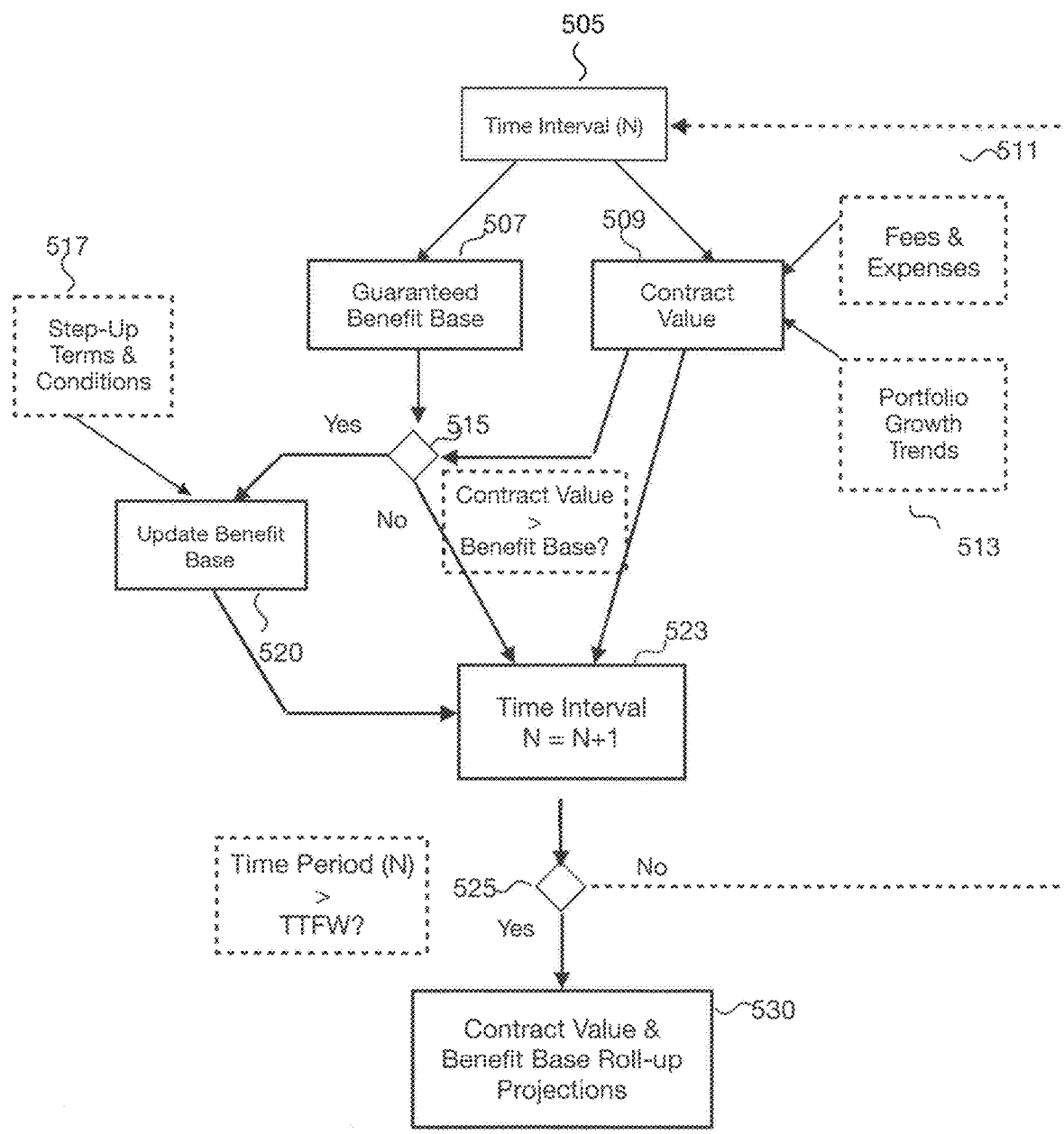
FIG. 5: Trend-line Projection

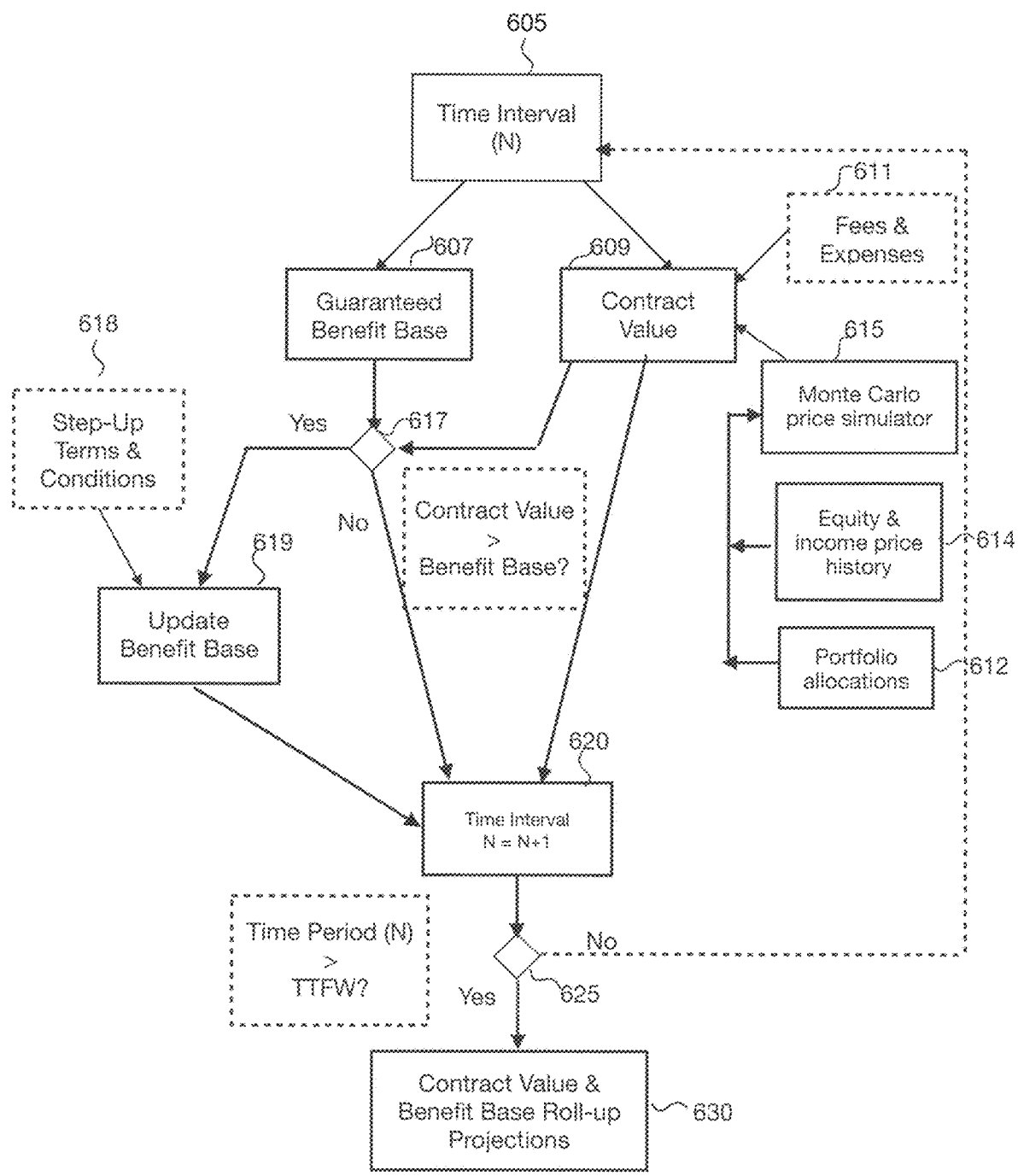
FIG. 6: Monte Carlo Simulation Module

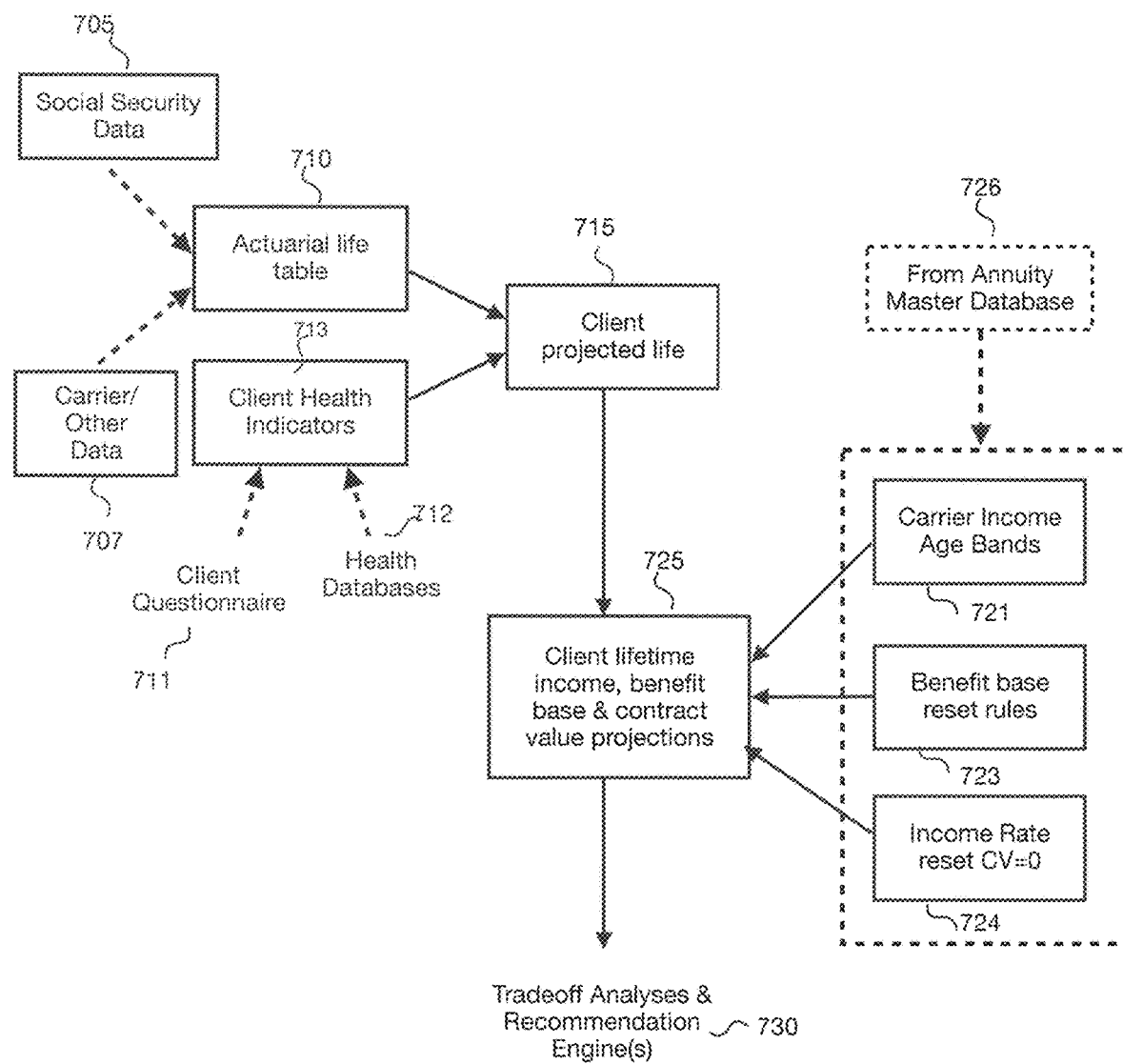
FIG. 7: Lifetime Income Projections

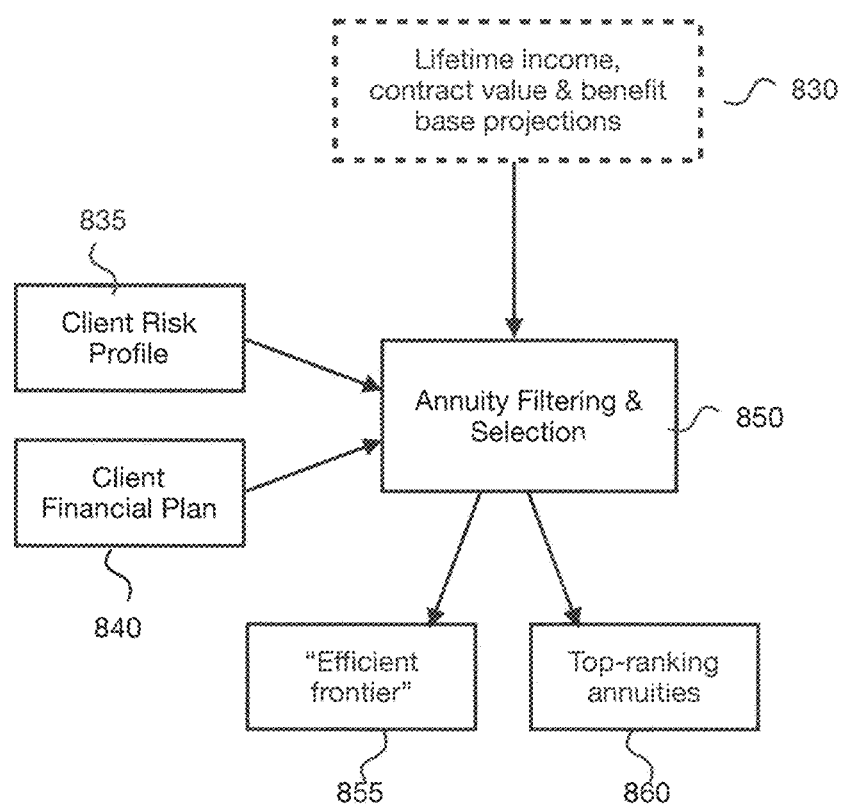
FIG. 8: Tradeoff Analyses & Recommendation Engine(s)

FIG. 9 A

XBRL Data
Insurance Company
Insurance Company Name
Insurance Company Credit Rating - Agency
Insurance Company Credit Rating - Value Carrier
Prefix

Annuity Product Features
Annuity Type
Product
M&E Charge
Admin Charge
Min Issue Age
Max Issue Age
CDSC (Years)
Death Benefit Option
Enhanced Death Benefit
Minimum Premium Qualified
Maximum Premium Qualified
Minimum Premium Non-qualified
Maximum Premium Non- qualified
Purchase Payment Credits
Plan Types
State Restrictions
Prospectus_Date
Reference_URL

FIG. 9 B

Product Features Explained
Annual_Contract_Fee
Enhanced DB 1 Cost
Enhanced DB 2 Cost
Min Issue Age
Max Issue Age
CDSC (Schedule)
Purchase Payment Credits
Rider Investment Restrictions
Available Benefits
Living Benefits
GMIB (Guaranteed Minimum Income Benefit)
GMAB (Guaranteed Minimum Accumulation Benefit)
GMWB (Guaranteed Minimum Withdrawal Benefit)
Lifetime Withdrawal Benefit (LWB)
Death Benefits
Return of Principal
Highest Anniversary Value
Fixed Percentage Increase
Earnings Enhancement

FIG. 9 C

<u>Rider Features</u>
LB_Rider Name
LB_Rider_Type
LB_Rider__Name
LB_Rider_Election
Step_Up_Reset_Time
Step_Up_Stackable
Income_Type
Max Roll Up Age
Accum_Type
Accum_Desc
Rider_Investment_Restrictions
Guaranteed Roll Up %
Guaranteed Roll up Period (Years)
Max Roll Up Age
Accum_Type

FIG. 9 D

Withdrawal Features
Single_Lifetime_withdraw
Joint_Lifetime_withdraw
Joint_Lifetime_Withdrawal_Based_On

FIG. 9 E

Rider Cost
Rider_Cost_Single_Life
Single_Max_Cost
Rider_Cost_Joint_Life
Joint_Life_Max_Cost
Rider_Enhancement
Enhancement_Cost
Cost_Charged_On

Guaranteed Roll Up
Simple
Compound
Bonus
Credit

FIG. 9 F

```xml
<group xmlns="http://www.xbrl.org/2001/instance" xmlns:xsi="http://www.w3.org/2001/XMLSchema-instance"
xmlns:iso4217="http://www.xbrlSolutions.com/taxonomies/iso4217/2002-06-30" xmlns:iascf-pfs="http://www.xbrl.org/taxonomy/int/fr/ias/ci/pfs/2002-11-15"
xmlns:novartis="http://www.xbrl.org/taxonomy/int/fr/ias/pfs/2002-11-15/Novartis-2002-11-15" xsi:schemaLocation="
http://www.xbrlSolutions.com/taxonomies/iso4217/2002-06-30 http://www.xbrlSolutions.com/taxonomies/iso4217/2002-06-30/iso4217.xsd
http://www.xbrl.org/taxonomy/int/fr/ias/pfs/2002-11-15 las-ci-pfs-2002-11-15-WINDOM.xsd http://www.xbrl.org/taxonomy/int/fr/ias/pfs/2002-11-15/Novartis-
2002-11-15 Novartis-2002-11-15.xsd ">

<iascf-pfs:RevenueFunction numericContext="Group2001ForPeriod">32038000000</iascf-pfs:RevenueFunction>
<iascf-pfs:RevenueFunction numericContext="Group2000ForPeriod">35905000000</iascf-pfs:RevenueFunction>
<iascf-pfs:CostSalesFunction numericContext="Group2001ForPeriod">7886000000</iascf-pfs:CostSalesFunction>
<iascf-pfs:CostSalesFunction numericContext="Group2000ForPeriod">10242000000</iascf-pfs:CostSalesFunction>
<iascf-pfs:GrossProfitFunction numericContext="Group2001ForPeriod">24152000000</iascf-pfs:GrossProfitFunction>
<iascf-pfs:GrossProfitFunction numericContext="Group2000ForPeriod">25563000000</iascf-pfs:GrossProfitFunction>
<iascf-pfs:MarketingDistributionCostsFunction numericContext="Group2001ForPeriod">11098000000</iascf-pfs:MarketingDistributionCostsFunction>
<iascf-pfs:MarketingDistributionCostsFunction numericContext="Group2000ForPeriod">10945000000</iascf-pfs:MarketingDistributionCostsFunction>
<iascf-pfs:ResearchDevelopmentFunction numericContext="Group2001ForPeriod">4189000000</iascf-pfs:ResearchDevelopmentFunction>
<iascf-pfs:ResearchDevelopmentFunction numericContext="Group2000ForPeriod">4657000000</iascf-pfs:ResearchDevelopmentFunction>
<iascf-pfs:AdministrativeExpensesFunction numericContext="Group2001ForPeriod">1598000000</iascf-pfs:AdministrativeExpensesFunction>
<iascf-pfs:AdministrativeExpensesFunction numericContext="Group2000ForPeriod">2078000000</iascf-pfs:AdministrativeExpensesFunction>
```

FIG. 10
Sample XBRL tags

FIG. 11: Sample XBRL output document

1105

The Income Base increases annually by the greater of 6% simple enhance-ments or the account value growth. The 6% annual growth will continue for the earlier of 10 years or through age 85 (based on the oldest life for joint) with the 10-year period restarting upon an account value reset. They are not available in any year a withdrawal occurs. Annual market step-ups are available through age 85 (based on the oldest life for joint coverage). In New York, the 6% enhancement is not available once the first Guaranteed Annual Income withdrawal occurs, but account value can be locked in through age 85.

| Guaranteed Annual Income Payouts | | | | |
|---|---|---|---|---|
| Age | Single | | Joint (based on younger life) | |
| | A/c value > 0 | A/c value = 0 | A/c value > 0 | A/c value = 0 |
| 75+ | 7.00% | 3.00% | 6.50% | 3.00% |
| 70 - 74 | 6.75% | 3.00% | 6.25% | 3.00% |
| 65 - 69 | 6.50% | 3.00% | 6.00% | 3.00% |
| 60 - 64 | 6.25% | 3.00% | 5.75% | 3.00% |

For non-qualified and qualified contracts ages 0-85

1110

| Attributes | X |
|---|---|
| Guaranteed Annual Income | |
| Tag | us-gaap.CashAndCashEquivalentsAtCarryingValue |
| Fact | 288,783,000 |
| Period | As of 9/30/2016 |
| Measure | USD |
| Scale | Thousands |
| Decimals | Thousands |
| Balance | Debit |

FIG. 12 A: Single policy, Initial premium

Premium Amount — Monthly Income

Annuity Contract Information

| State of Issue | Type (Required) | Initial Premium | Income Beginning (Year) |
|---|---|---|---|
| District of Columbia (DC) | Single | $100,000.00 | 7 |

| Owner Name | Owner Sex | Owner Age | Owner Age at First Withdrawal |
|---|---|---|---|
| John Doe | Male | 58 | 65 |

Reset    Calculate

FIG. 12 B: Joint policy, Initial premium

IncomeWizardPRO™

Premium Amount | Monthly Income

Annuity Contract Information

State of Issue: District of Columbia (DC)
Type (Required): Joint
Initial Premium: $100,000.00
Income Beginning (Year): 7

Owner Name: John Doe
Owner Sex: Male
Owner Age: 58
Owner Age at First Withdrawal: 65

Spouse Name: Jane Smith
Spouse Sex: Female
Spouse Age: 60
Spouse Age at First Withdrawal: 67

Reset | Calculate

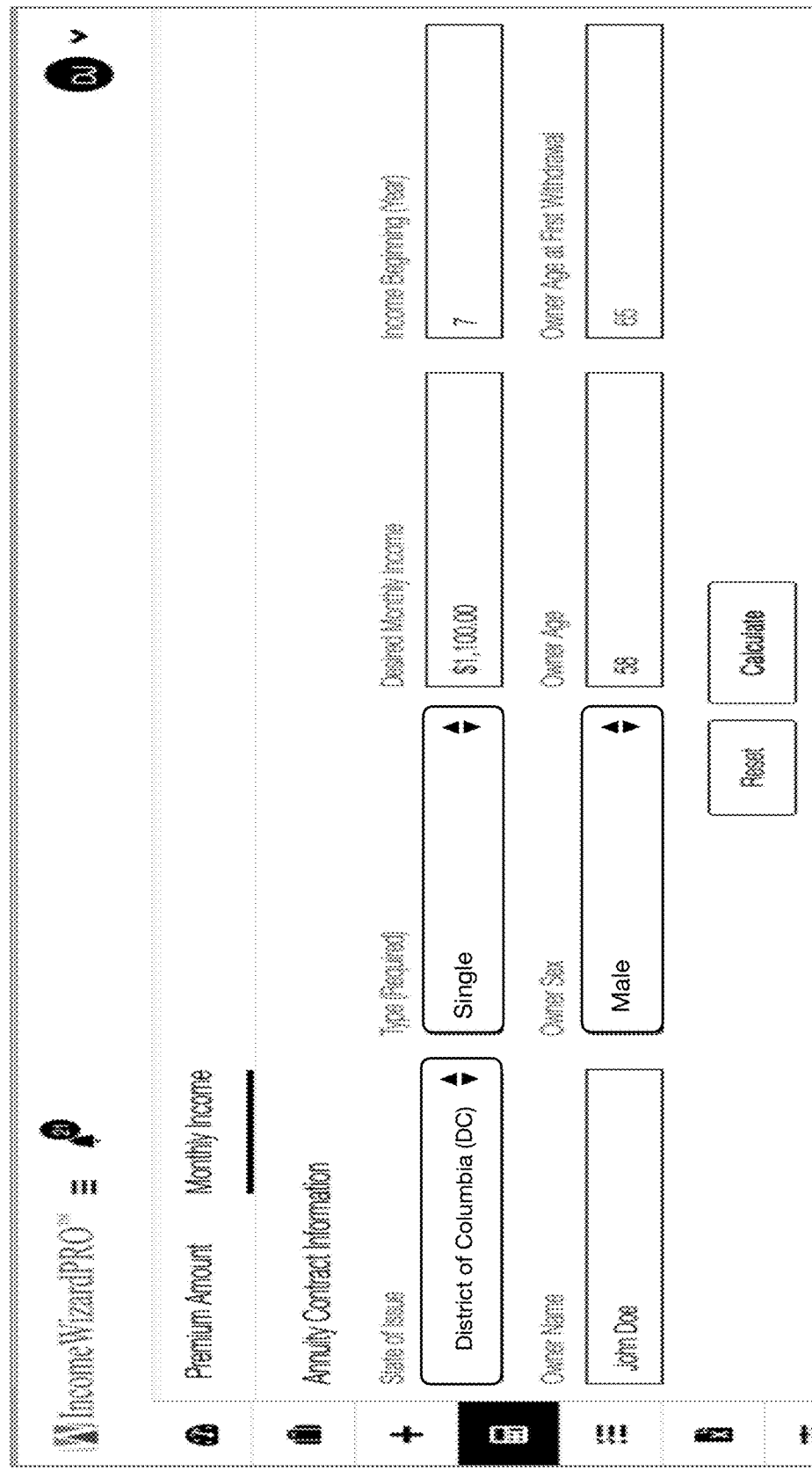
FIG. 12 C: Single policy, Monthly income requirement

FIG. 12 D: Joint policy, Monthly income requirement

Premium Amount Monthly Income

Annuity Contract Information

| State Of Issue | Type (Required) | Initial Premium | First Withdrawal (Yrs.) |
|---|---|---|---|
| Illinois (IL) | Single | $100,000.00 | 9 |

| Owner Name | Owner Sex | Owner Age | Owner Age at First Withdrawal |
|---|---|---|---|
| John Doe | Male | 58 | 67 |

Reset   Calculate

Top 1-5 Monthly Payments ▸   All Carriers ▸   Annuity Type ▸

Compare

| | Carrier | Credit Rating | Product | Annuity Type | Living Benefit Rider | Monthly Payment | Guaranteed Roll Up | Withdrawal Rate | Benefit Base |
|---|---|---|---|---|---|---|---|---|---|
| ☐ | Lincoln Financial Group | A+/AA-/A1 | Lincoln ChoicePlus AssuranceSM | Variable Annuity | Lincoln Max 6 SelectSMAdvantage | $834.17 | 6.00% | 6.50% | $154,000.00 |
| ☐ | Lincoln Financial Group | A+/AA-/A1 | American Legacy® | Variable Annuity | Lincoln Max 6 SelectSMAdvantage | $834.17 | 6.00% | 6.50% | $154,000.00 |
| ☐ | Global Atlantic | A/A-/A3 | ForeIncome II | Fixed Index Annuity | Guaranteed Income Builder Benefit | $823.33 | 10.00% | 5.20% | $150,000.00 |
| ☐ | Transamerica | A+/AA-/A1 | Transamerica Variable Annuity Series B | Variable Annuity | Retirement Income Max® | $779.01 | 7.20% | 5.00% | $186,961.88 |
| ☐ | Jackson National Life | A+/AA-/A1 | Perspective II | Variable Annuity | LifeGuard Freedom Flex @ 7% Bonus Level 5 | $766.02 | 7.00% | 5.00% | $183,845.92 |

Displaying Annuity Contracts 1 -5 of 43 in total

← Previous  ① 2 3 4 5 6 7 8 9  Next →

FIG. 13a

Guaranteed Monthly Income (GMI) for Specified Premium - Highest to Lowest

Annuity Contract Information

| State Of Issue | Type (Required) | Monthly Payment | First Withdrawal (Yrs.) | | Reset | Calculate |
|---|---|---|---|---|---|---|
| Illinois (IL) | Single | $1,000.00 | 9 | | | |

| Owner Name | Owner Sex | Owner Age | Owner Age at First Withdrawal |
|---|---|---|---|
| | Male | 58 | 67 |

Show All ▼   All Carriers ▼   Annuity Type ▼   Options ▼

| | Carrier | Credit Rating | Product | Annuity Type | Living Benefit Rider | Premium Amount | Guaranteed Roll Up | Withdrawal Rate | Benefit Base |
|---|---|---|---|---|---|---|---|---|---|
| ☐ | Lincoln Financial Group | A+/AA-/A1 | Lincoln ChoicePlus AssuranceSM | Variable Annuity | Lincoln Max 6 SelectSMAdvantage | $119,880.12 | 6.00% | 6.50% | $184,615.38 |
| ☐ | Lincoln Financial Group | A+/AA-/A1 | American Legacy® | Variable Annuity | Lincoln Max 6 SelectSMAdvantage | $119,880.12 | 6.00% | 6.50% | $184,615.38 |
| ☐ | Global Atlantic | A/A/A3 | ForeIncome II | Fixed Index Annuity | Guaranteed Income Builder Benefit | $121,457.49 | 10.00% | 5.20% | $230,769.23 |
| ☐ | Transamerica | A+/AA-/A1 | Transamerica Variable Annuity Series B | Variable Annuity | Retirement Income Max® | $129,356.41 | 7.20% | 5.00% | $240,000.00 |
| ☐ | Jackson National Life | A+/AA-/A1 | Perspective II | Variable Annuity | LifeGuard Freedom Flex ® 7% Bonus Level 5 | $130,544.10 | 7.00% | 5.00% | $240,000.00 |
| ☐ | Prudential Annuities | A+/AA-/A1 | PRUDENTIAL PREMIER® RETIREMENT | Variable Annuity | Highest Daily Lifetime® Income v3.0 Benefit | $132,349.13 | 5.50% | 5.60% | $214,285.71 |
| ☐ | Transamerica | A+/AA-/A1 | Transamerica Variable Annuity Series B | Variable Annuity | Retirement Income Choice® 1.6 | $134,755.49 | 5.50% | 5.50% | $218,181.82 |
| ☐ | Jackson National Life | A+/AA-/A1 | Perspective II | Variable Annuity | LifeGuard Freedom Flex ® 7% Bonus Level 4 | $137,414.84 | 7.00% | 4.75% | $252,631.58 |
| ☐ | Nationwide | A+/A/A1 | Nationwide Destination ArchitectSM Annuity 2.0 | Variable Annuity | Lifetime Income Rider (L.Inc) | $137,606.79 | 7.00% | 5.35% | $224,299.07 |
| ☐ | Nationwide | A+/A/A1 | Nationwide Destination NavigatorSM 2.0 and New York | Variable Annuity | Lifetime Income Rider (L.Inc) | $137,606.79 | 7.00% | 5.35% | $224,299.07 |

FIG. 13b

Premium Required for Desired GMI – Lowest to Highest

1400

| Annuity Contracts Comparison | | | | Generate Report |
|---|---|---|---|---|
| State: Illinois (IL) | Type: Single | Premium Amount: $100,000.00 | | TTFW(Years): 9 |
| Owner Name: John Doe | Owner Sex: Male | Owner Age: 58 Yrs. | | Owner Age at First Withdrawal: 67 Yrs. |

| | Global Atlantic<br>Guaranteed Income Builder Benefit | Lincoln Financial Group<br>Lincoln Max 6 SelectSMAdvantage | Transamerica<br>Retirement Income Max® |
|---|---|---|---|
| | ○ | ○ | ○ |
| Carrier | Global Atlantic | Lincoln Financial Group | Transamerica |
| Product | ForeIncome II | Lincoln ChoicePlus AssuranceSM | Transamerica Variable Annuity Series B |
| Living Benefit Rider | Guaranteed Income Builder Benefit | Lincoln Max 6 SelectSMAdvantage | Retirement Income Max® |
| Guaranteed Rollup | 10.0% | 6.0 % | 7.2% |
| Guaranteed Withdrawal Rate% | 5.2% | 6.5% | 5.0% |
| Roll Up Type | Simple | Simple | Compound |
| Benefit Base At Withdrawal | $190,000.00 | $154,000.00 | $186,961.88 |
| Monthly Payment | $823.33 | $834.17 | $779.01 |
| Payment Based on Life Expectancy | $161,833.74 | $163,964.46 | $153,122.21 |
| Annuity Type | Fixed Index Annuity | Variable Annuity | Variable Annuity |
| Admin Charge | N/A | 0.1 | N/A |
| M&E Charge | N/A | 1.15 | N/A |
| Min Issue Age | N/A | N/A | N/A |
| Max Issue Age | N/A | N/A | N/A |
| CDSC (Yrs.) | N/A | N/A | N/A |
| Death Benefit Option | ✗ | ✗ | ✗ |
| Enhanced Death Benefit | ✗ | ✗ | ✗ |
| Minimum Premium | N/A | N/A | N/A |
| Maximum Premium | N/A | N/A | N/A |
| Purchase Payment Credits | ✗ | ✗ | ✗ |
| Rider Investment Restrictions | ✗ | ✗ | ✗ |
| Plan Types | | | |
| Carrier Credit Rating | N/A | N/A | N/A |
| Reference URL | N/A | N/A | N/A |

FIG. 14

Guaranteed Baseline Benefit Base & Monthly Income Comparison Table

Benefit Base & Withdrawals - No Step-Ups

Step-Up Example - Lincoln Max 6 SelectSM Advantage[1]

Trend Line Forecast & Step-Up Calculations - Overall

| Trend-Line Forecast | | | | | | | | |
|---|---|---|---|---|---|---|---|---|
| Year | Cash Value | Roll Up (6.00% Simple) | Benefit Base | AW | CW | Gross Return 11.10% | Total M&E 1.15% | LB Rider 1.25% Default | Sub-Account Expenses 0.75% Default |
| Year 0 | $100,000.00 | $100,000.00 | $100,000.00 | $0.00 | $0.00 | $100,000.00 | $0.00 | $0.00 | $0.00 |
| Year 1 | $107,950.00 | $106,000.00 | $107,950.00 | $0.00 | $0.00 | $111,100.00 | $1,150.00 | $1,250.00 | $750.00 |
| Year 2 | $116,472.00 | $112,000.00 | $116,472.00 | $0.00 | $0.00 | $119,932.45 | $1,277.65 | $1,349.38 | $833.25 |
| Year 3 | $125,666.00 | $118,000.00 | $125,666.00 | $0.00 | $0.00 | $129,400.39 | $1,379.22 | $1,455.90 | $899.49 |
| Year 4 | $135,585.00 | $124,000.00 | $135,585.00 | $0.00 | $0.00 | $139,614.93 | $1,486.10 | $1,570.83 | $970.50 |
| Year 5 | $146,287.00 | $130,000.00 | $146,287.00 | $0.00 | $0.00 | $150,634.94 | $1,605.57 | $1,694.81 | $1,047.11 |
| Year 6 | $157,834.00 | $136,000.00 | $157,834.00 | $0.00 | $0.00 | $162,524.86 | $1,732.39 | $1,828.59 | $1,129.76 |
| Year 7 | $170,293.00 | $142,000.00 | $170,293.00 | $0.00 | $0.00 | $175,353.57 | $1,869.04 | $1,972.93 | $1,218.94 |
| Year 8 | $183,736.00 | $148,000.00 | $183,736.00 | $0.00 | $0.00 | $189,195.52 | $2,016.57 | $2,128.66 | $1,315.15 |
| Year 9 | $198,238.00 | $154,000.00 | $198,238.00 | $0.00 | $0.00 | 204,129.59 | $2,175.75 | $2,296.69 | $1,418.97 |
| Year 10 | $201,001.00 | $154,000.00 | $201,001.00 | $12,885.47 | $12,885.47 | $207,356.95 | $2,347.49 | $2,477.98 | $1,530.97 |
| Year 11 | $203,795.00 | $154,000.00 | $203,795.00 | $13,065.07 | $25,950.54 | $210,247.05 | $2,384.60 | $2,512.51 | $1,555.18 |
| Year 12 | $206,627.00 | $154,000.00 | $206,627.00 | $13,246.68 | $39,197.21 | $213,169.57 | $2,417.84 | $2,547.44 | $1,576.85 |
| Year 13 | $209,499.00 | $154,000.00 | $209,499.00 | $13,430.76 | $52,627.97 | $216,131.84 | $2,451.45 | $2,582.84 | $1,598.77 |
| Year 14 | $212,411.00 | $154,000.00 | $212,411.00 | $13,617.44 | $66,425.40 | $219,135.95 | $2,485.52 | $2,618.74 | $1,620.99 |
| Year 15 | $215,363.00 | $154,000.00 | $215,363.00 | $13,806.72 | $80,052.12 | $222,181.91 | $2,520.06 | $2,655.14 | $1,643.52 |
| Year 16 | $218,356.00 | $154,000.00 | $218,356.00 | $13,998.60 | $94,050.71 | $225,269.70 | $2,555.09 | $2,692.04 | $1,666.36 |
| Year 17 | $221,391.00 | $154,000.00 | $221,391.00 | $14,193.14 | $108,243.85 | $228,400.38 | $2,590.60 | $2,729.45 | $1,689.52 |
| Year 18 | $224,468.00 | $154,000.00 | $224,468.00 | $14,390.42 | $122,634.27 | $231,574.99 | $2,626.60 | $2,767.39 | $1,713.00 |
| Year 19 | $227,588.00 | $154,000.00 | $227,588.00 | $14,590.42 | $137,224.69 | $234,793.53 | $2,663.11 | $2,805.85 | $1,736.81 |
| Year 20 | $230,751.00 | $154,000.00 | $230,751.00 | $14,793.22 | $152,017.91 | $238,057.05 | $2,700.13 | $2,844.85 | $1,760.95 |
| Year 21 | $233,958.00 | $154,000.00 | $233,958.00 | $14,998.82 | $167,016.72 | $241,365.55 | $2,737.66 | $2,884.39 | $1,785.43 |
| Year 22 | $237,210.00 | $154,000.00 | $237,210.00 | $15,207.27 | $182,223.99 | $244,720.07 | $2,775.70 | $2,924.48 | $1,810.24 |
| Year 23 | $240,507.00 | $154,000.00 | $240,507.00 | $15,418.65 | $197,642.64 | $248,121.66 | $2,814.28 | $2,965.13 | $1,835.40 |
| Year 24 | $243,850.00 | $154,000.00 | $243,850.00 | $15,632.96 | $213,275.60 | $251,570.32 | $2,853.40 | $3,006.34 | $1,860.91 |
| Year 25 | $247,239.00 | $154,000.00 | $247,239.00 | $15,850.25 | $229,125.85 | $255,067.10 | $2,893.06 | $3,048.13 | $1,886.78 |
| Year 26 | $250,675.00 | $154,000.00 | $250,675.00 | $16,070.54 | $245,196.38 | $258,611.99 | $2,933.27 | $3,090.49 | $1,913.00 |
| Year 27 | $254,159.00 | $154,000.00 | $254,159.00 | $16,293.88 | $261,490.26 | $262,206.05 | $2,974.04 | $3,133.44 | $1,939.59 |
| Year 28 | $257,691.00 | $154,000.00 | $257,691.00 | $16,520.34 | $278,010.59 | $265,850.31 | $3,015.37 | $3,176.99 | $1,966.55 |
| Year 29 | $261,272.00 | $154,000.00 | $261,272.00 | $16,749.92 | $294,760.51 | $269,544.79 | $3,057.28 | 3,221.14 | $1,993.88 |
| Year 30 | $264,903.00 | $154,000.00 | $264,903.00 | $16,982.68 | $311,743.19 | $273,290.51 | $3,099.77 | $3,265.90 | $2,021.59 |

Cancel

FIG. 17b

Trend Line Forecast & Step-Up Calculations - Detail View

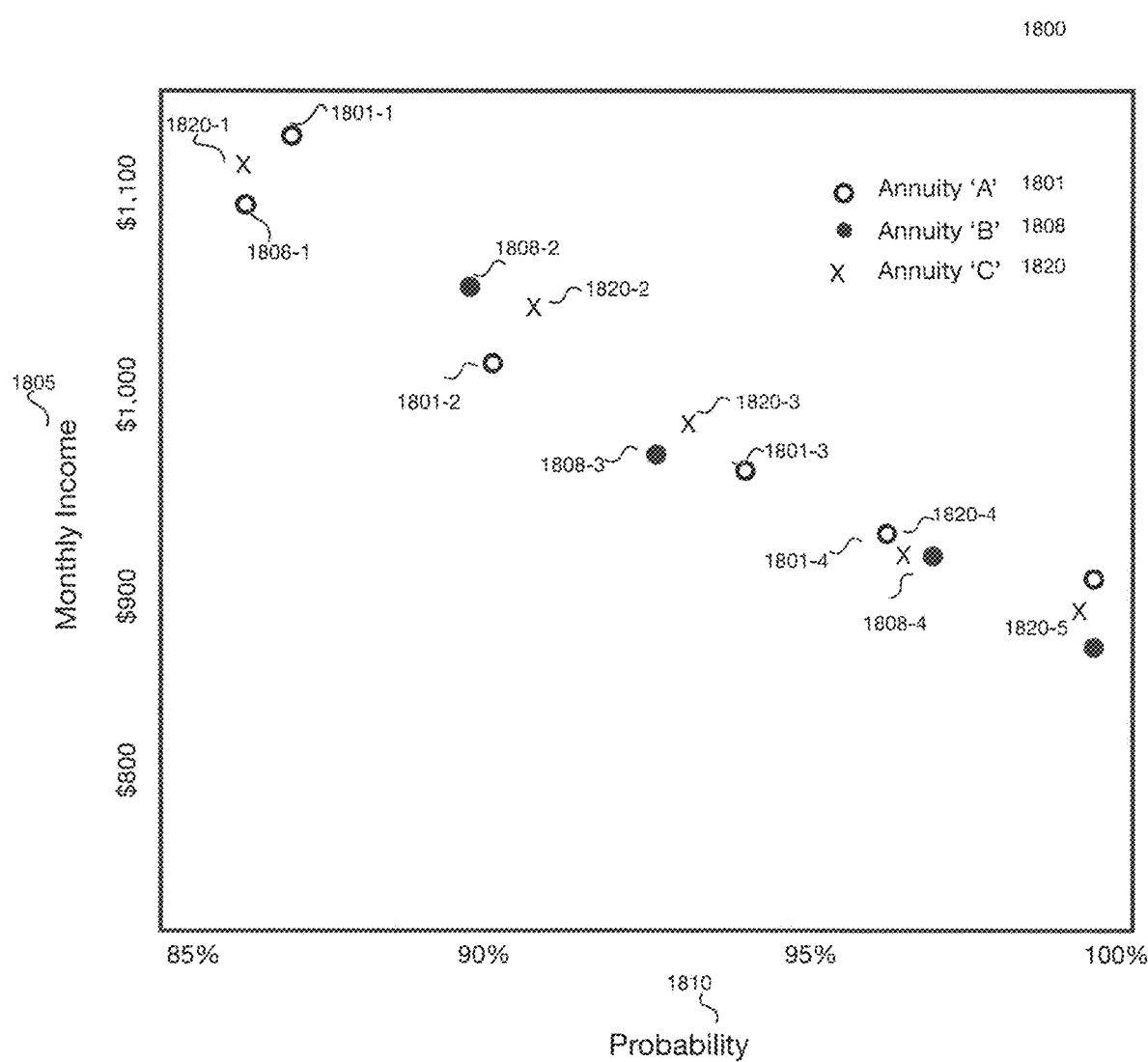

PERFORMANCE MEASUREMENT AND REPORTING FOR GUARANTEED INCOME FINANCIAL PRODUCTS AND SERVICES

This application claims the benefit of the right of priority to U.S. Provisional Patent Application Ser. No. 62/792,653 filed Jan. 15, 2019 and is incorporated by reference herein in its entirety.

TECHNICAL FIELD

This patent application relates generally to the technical field of evaluation, ranking, and reporting the performance of financial products providing income and/or wealth appreciation guarantees. These services may be referred to herein as a WEALTHBOOK™ INCOME WIZARD™ Financial Service.

BACKGROUND

Guaranteed income products such as annuities, private pension schemes and longevity insurance, are essential for providing old-age security to millions of people in every part of the world. In the United States, for example, annuities account for $2.7 Trillion in assets and are owned by over sixteen million people or approximately a third of all persons over 65 years of age. As company—and (in some cases) government-sponsored defined benefit pensions continue to disappear, and social security benefits are inadequate (or non-existent) to meet retirees' needs, guaranteed income products (primarily annuities) are becoming an increasingly important vehicle for savings and lifetime protection from destitution.

The idea of paying out a stream of income to an individual or family dates back to the Roman Empire. The Latin word annua meant annual stipends, and during the reign of the emperors, the word signified a contract that made annual payments. In the United States, an early recorded use of annuities was by the Presbyterian Church in 1720, to provide secure retirement to aging ministers and their families and later extended to widows and orphans. In 1912, Pennsylvania Company Insurance was among the first to begin offering annuities to the general public in the United States.

Cooperstein, U.S. Pat. No. 5,893,071 issued Apr. 6, 1999, described an early "Annuity Value Software," which is allegedly capable of transforming annuity contract purchase value data to tangible deferred and immediate annuity contract values at one or more selected dates during a life period of the contract.

An eXtensible Business Reporting Language (XBRL) has been developed for exchanging business and financial information in machine-readable form. XBRL may provide a semantic meaning to define and exchange financial information such as financial statements and prospectuses. However, XBRL has not been extended to guaranteed income products.

Annuities form the largest class of guaranteed income products. Annuities may be immediate in which case income payments start immediately upon completion of the sale; or annuities may be deferred, in which case income payments are delayed ('deferred') for a pre-specified interval (the 'accumulation phase') during which the premium is invested in a variety of mutual funds or other financial instruments. Annuity payments can be fixed, i.e. the income payments are a set amount; or income payments can be variable, in which case the amount can increase or decrease depending on the performance of the underlying funds.

A problem in the prior art is that annuities from different providers are not able to evaluate the likely income provided by each product, especially at a given level of confidence.

A typical annuity's return has two components: the guaranteed minimum income (GMI) plus an additional, variable component whose value depends on the performance of the underlying mutual funds (for variable annuities) or tracking index (fixed index annuities):

Total annuity return=GMI(fixed)+'Investment returns'(variable).

Thus, to accurately compare two or more annuity products, it is necessary to estimate the likely effect of investment returns on the total annuity return.

In addition to the inherent variability of investment returns, any comparisons must take into account additional factors including:
a. Carrier policies regarding portfolio selection (variable annuities) or participation in index returns (fixed indexed annuities);
b. Downside protection, i.e. the degree to which the annuity purchaser is protected from declines in portfolio (or index) value;
c. Portfolio management restrictions e.g. how often can a portfolio be rebalanced or re-allocated to different funds/indexes; and
d. Buyer's risk capacity—the annuity buyer's objective ability to take on risk—and risk aversion—the buyer's emotional/behavioral willingness to take on financial risk Several factors must be considered when evaluating the performance or pricing of an annuity, especially a variable annuity. These include:

Guarantees Insurance companies provide guarantees on the principal, the accumulation rate, the payment or withdrawal percentage(s), length of the payment and other factors.

Limitations/restrictions Annuities have restrictions on early withdrawal (i.e. before the pre-agreed accumulation period expires), regular withdrawals post-accumulation, portfolio allocations, or investments in specific funds.

Features/riders Annuity policies usually have a number of options relating to accumulation, payment guarantees, death benefits, and annuitization.

Fees & expenses These include M&E (mortality and expense) and administrative fees, fund-specific fees, early withdrawal penalties, and others.

In evaluating an annuity, the advisor/investor may also consider the investor's (or beneficiary's) age, sex, expected or actuarial lifespan, age at first withdrawal, single or joint (i.e. individual or provision for surviving spouse/partner) and so forth.

To understand the impact of investment returns, consider two annuities: Annuity 'A' is invested exclusively in Treasury bills yielding between 1.5% and 2.5% per annum. Annuity 'B' is invested exclusively in high-growth, large-cap stocks, averaging (historically) 7.0% per annum, with the buyer protected against downturns in portfolio value. At present, hypothetically, insurers are not able to provide a 7.0% guaranteed withdrawal rate for such policies. For simplicity, one may assume that the portfolio value will remain equal to the highest value reached before a downturn. Assuming that the buyer invests $100,000.00 in each annuity, and both annuities have the same deferral period of 10 years, annuity 'A' has to offer a GMI twice as large as annuity 'B' to be competitive (see Table 1(a)), assuming that high growth, large-cap stocks will maintain their historical growth rate over the next ten years.

TABLE 1(a)

Effect of Investment Returns - Without Fees & Volatility

|  | Annuity A | Annuity B |
|---|---|---|
| Initial premium | $100,000.00 | $100,000.00 |
| Deferral period | 7 years | 7 years |
| Portfolio | Treasuries | High growth, large cap stocks |
| Average annual growth rate | 2.0% | 7.0% |
| Account Value (Year 11) | $122,000.00 | $197,000.00 |
| Guaranteed minimum income | $ 7,000.00 | $ 6,000.00 |
| Guaranteed withdrawal rate | 7.0% | 6.0% |
| Total annuity income (Year 11) | $ 8540.00 | $ 11,820.00 |

This comparison becomes more difficult when we include the effect of fees and variability in returns (Table 1(b)); see Table 1(b) below. If Annuity 'A' has fees of 0.75% and low volatility, while Annuity 'B' charges fees of 3.75% and portfolio returns can vary from 3.0% to 9.5% (before fees), the situation changes significantly. Further a risk-averse buyer may prefer the certainty of Treasury-backed returns versos the volatility of stock market return while another, less risk-averse buyer may prefer the large-cap, high growth option.

TABLE 1(b)

Effect of Investment Returns - With Fees & Volatility

|  | Annuity A | Annuity B |
|---|---|---|
| Initial premium | $100,000.00 | $100,000.00 |
| Deferral period | 7 years | 7 years |
| Portfolio | Treasuries | High growth, large cap stocks |
| Average annual growth rate | 2.0% | 7.0% |
| Account Value (Year 11) | $119,000.00 | $100,000.00-$175,000.00 |
| Guaranteed minimum income | $7,000.00 | $6,000.00 |
| Guaranteed withdrawal rate | 7% | 6% |
| Total fees | 0.75%/annum | 3.75%/annum |
| Variation in returns | 1.75%-2.5% | 3.0%-9.5% |
| Total annuity income (Year 11) | $8,540.00 | $6,000.00-$10,500.00 |

There are various approaches utilized in known annuity evaluation systems. For simplicity, one may assume that the portfolio value will remain equal to the highest value reached before a downturn. At present financial advisors/insurance agents use a combination of 'illustrations' and 'risk profiling' to help clients choose between different annuity products:
   a. illustrations Advisors and agents generate hypothetical scenarios ('illustrations') showing how a particular product would perform in terms of account value and guaranteed payouts over the buyer's lifetime. These illustrations are based on average rates, historical equity and income fund growth rates or some combination.
   b. Risk profiling Advisors/agents may also complete a risk profile of the client to evaluate their risk appetite. There are a large number of known risk profiling questionnaires and software.

There exist problems with these known approaches. Illustrations are historically based and may have little relation to future returns, hence, the well-known caveat: "Past performance is no guarantee of future performance." Risk profiling is widely used due to regulatory requirements, for example, see FINRA Rule 2111, MiFID II used in Europe. There may be general agreement that a product's suitability depends on the characteristics of the client investor and not the product itself; see, for example, Davies et al., "Risk Tolerance: Essential, Behavioral and Misunderstood," *Journal of Risk Management in Financial Institutions*, vol. 2: pp. 110-113, 2014.

Consequently, comparing annuities from different providers is practically impossible even for trained professionals and such comparisons are beyond the reach of individual investors. Annuity prospectuses can be hundreds of pages long, laden with industry-specific terms (e.g. 'contingent deferred sales charge (CDSC)' fees), a variety of fees and expenses, and exclusions/limitations. Understanding the various features and comparing different companies' products is a gargantuan task even for industry experts. Annuities are difficult for the average financial advisor to explain and the complications require considerable effort to understand completely.

Steinworth et al., in their article "Valuing Variable Annuities with Guaranteed Minimum Lifetime Withdrawal Benefits," (National Bureau of Economic Research, April, 2012) discuss two yardsticks that academics often use to evaluate annuities: their MWR ('money's worth ratio') or their. AEW ('annuity equivalent wealth'). MWR compares the expected present value of the annuity's payment stream to the money paid for the annuity. AEW is a widely-used measure of how much non-annuitized wealth someone lacking access to an annuity would be willing to pay to purchase the VA product.

Advisors/investors can compare the features and fees of different annuities from prospectus summaries or via services such as Morningstar® Annuity Intelligence or Cannex VA or Cannex FA. Morningstar announced this service and related software in 2017. The Morningstar web site does not provide details. Annuity sales professionals can obtain hypothetical projections from insurance carriers showing the performance of a specific annuity product for a specific prospect/client.

Cannex Financial Exchange Limited, on the other hand, has applied for a U.S. patent and their application has published as US 2018/0130132 on May 10, 2018. The patent application discusses a client's ability to determine a present economic value of an annuity contract The value is calculated as a lapse value if a client wishes to exit the annuity contract, a death value (a value at death to an estate) and an income value determined as an actuarial present value of future income by performing Monte Carlo simulations.

In view of the above, there remains a problem in the art of evaluating guaranteed income products for clients of financial advisors as well as for financial advisors use.

SUMMARY OF THE PREFERRED EMBODIMENTS

An object of the present invention is to compare products with different return rates and to find those products which truly fit a client or a financial advisor's preferences when assisting a client.

A further object of the present invention is to do so using an XBRL parser as described by flowcharts provided herein.

A further object of the present invention is to provide for calculating an expected return on investment looking into the future for a guaranteed annuity product at a predetermined confidence level such as a 90% confidence level.

The patent application describes methods and apparatus, including computer program products and special purpose computer apparatus which may comprise client computers, secure communication links, local servers, cloud-based servers and communication links for requesting and receiving financial product data to be operated on by special purpose computer products for evaluating and reporting the performance, including predicted performance of specialized insurance/financial products that provide guaranteed income responsive to specific profile data for a particular individual which may include a married couple or group of individuals. The described methods and apparatus evaluate likely income of different annuity products. One may calculate a given annuity product's annuity return cumulative distribution function and compare guaranteed minimum income (GMI) as well as the lowest projected income which exceeds a given level of probability. For example, with a 90% level of confidence, a given guaranteed annuity product may be compared by both GMI and level of projected income.

Described herein is a method performed using one or more servers and client computers which comprises obtaining and compiling financial data relating to guaranteed income products and services residing on individual financial services providers' servers. The method also comprises parsing and categorizing the financial data according to a standardized taxonomy to create a standardized database that categorizes like data together for comparison with parsed data of other insurance/financial product instruments. Information in this standardized database is then used to calculate and predict guaranteed monthly income over a potential purchaser's actuarial lifespan. Various products from insurance companies and other providers of annuity-based products are ranked using these projections for specific individual investor profiles. These projections form the basis of recommendation engines to help select products that fit a particular investor's profile. Data from the standardized database, financial projections and rankings may also be provided to third parties for further custom processing. The method may include any or more of the features described herein either alone or in combination, examples of which are as follows:

The financial data may comprise costs, fees, investment opportunities and restrictions and other terms and conditions specific to the provider of that guaranteed income product/service. The data may be part of a regulatory filing or prospectus, gathered from a web site, taken from advertising brochures and may reside on the providers' servers or otherwise input for parsing and building a database. The data may be characterized and organized according to an individual guaranteed income provider's practices and preferences or it may be categorized as required by regulatory filings. Service providers may update the data periodically requiring the input data be periodically verified; the providers may also add new products/services to their offerings or remove existing products/services which also requires periodic monitoring.

The data received from the providers of guaranteed income products/services is categorized according to a standard classification. This categorization may be done manually or using computer technology. The categorized data is examined for accuracy and completeness, either by subject matter experts or preferably by automated algorithms such as parsing algorithms based on machine learning or other classification schemes.

The categorized and inspected data is added to a master database which is intended to hold all current and past data about all guaranteed income products/services currently offered or that have been offered in the recent past. This database may use version control software to maintain current and prior versions of product/service data. This categorized and standardized data may be offered to guaranteed income providers, regulators, other financial institutions or researchers.

The categorized and standardized data is used to create a guaranteed minimum income baseline (GMI) by combining investor-specific data with product data from the master database. The GMI is specific to a given investor and is a foundation for further analyses for the given investor. The GMI enables analysts to get an initial comparison and ranking of products/services for a specific investor. The results can be sorted in various ways using filters incorporated in the software.

The method builds further on the GMI by creating projections to judge the effects of various product/service features on likely income. These projections may use a variety of methods from financial analytics. They may allow analysts to evaluate the performance of the product/service under a wide range of economic and investment scenarios. These projections may be incorporated into internal or external recommendation engines. Such recommendation engines combine the investor's risk preferences with the projections to identify suitable products/services for meeting the investor's needs for guaranteed income in the future.

Any two or more of the features described in this patent application, including this summary section, may be combined to form embodiments not specifically described in this patent application.

All or part of the foregoing may be implemented as a computer program product operable using special purpose client, server and cloud computers and communication paths or links comprised of instructions that are stored on one or more non-transitory, machine-readable storage media, and that are executable on one or more processing devices. All or part of the foregoing may be implemented as an apparatus, method, or system that may include one or more processing devices and memory to store executable instructions to implement functionality.

The details of one or more examples are set forth in the accompany drawings and the description below. Further features, aspects and advantages will become apparent from the following brief description, detailed description, the drawings, and the claims.

BRIEF DESCRIPTION OF THE DRAWINGS

FIG. 1A shows an overview of the processes of measuring performance and reporting for guaranteed income financial products and services and shows an example of the foregoing processes conceptually from obtaining financial data from, for example, insurance carriers such as a prospectus for a given financial income product, summary data for the product and updates of a given product, new products and historically significant data of older products including those no longer offered to the public. The objective of the steps of data acquisition, forming an annuity master database and performing analytics and forecasting is to provide Wealth-Book™ Income Wizard™ service filtering and recommendation software to make a specific ranking of products comprising at least one recommended product offered, for example, by an insurance carrier to an annuity contract purchaser (client-based), to a broker/dealer recommendation engine based on prospect profile data and to carriers, sell-side analysts, regulators (such as state and federal agencies) and consumer groups (for example, AARP). FIG. 1B provides a data model showing a reporting entity carrier and the collection of data for transmission on query from the WealthBook Income Wizard, cloud-based, 110, of FIG. 1A. FIG. 1C provides a carrier model for a particular carrier 1 gathering data on command of the cloud-based server of FIG. 1A including a current (or past prospectus), summary updates, a prospectus data reference manual, and other data such as validation criteria, report instructions, business rules and forms.

FIG. 3 is a flowchart for Analysis and Forecasting 110-3 (FIG. 1) responsive to the processes of FIG. 2 which details the processes used to collect, extract and standardize key product data (e.g. guaranteed accumulation and income/withdrawal rates). These processes are designed to handle the wide variations in terminology between different types of guaranteed income providers (e.g. fixed indexed annuities versus variable annuities) as well as differences in terminology between different providers within the same category. These processes also provide for consistent review, both automated expert system and human to ensure accuracy and completeness. A specialized eXtensible Business Reporting Language (XBRL) parser 210 is preferably utilized to build an annuity master database 110-2 (FIG. 1) per the FIG. 2A through FIG. 2J flowcharts. Trend-line forecasts 320, Monte Carlo simulations 325 and various economic scenarios 330 are taken into consideration to develop lifetime income projections from each process. The result of FIG. 3 is a trade-off and risk analysis, and an annuity selection 340 (of at least one annuity product of many that may be considered), FIG. 4 shows a flowchart for the automated GMI calculation (guaranteed minimum benefit base and income 420) for a given financial product for an annuity contract purchaser (dashed line box 412 provides investor profile data (such as gender, age and age at first withdrawal).

FIG. 5 provides a trend-line projection flowchart with a given time interval such as N years of payments desired resulting in a given contract value and benefit base roll-up projection. The dotted line boxes show estimated fees, portfolio growth trends and any step-up terms and conditions for a given annuity contract. FIG. 5 is not limited to a trend line projection, because as historical data builds on itself, curve projection may be utilized as the initial line projection is no longer applicable.

FIG. 6 is similar to FIG. 5 in predicting a given contract value and benefit base roll-up projection for a given annuity contract over a period of N years with the same dotted line, fees, step-up terms and the like. FIG. 6, however, utilizes a Monte Carlo simulation module which may be compared with the output of FIG. 5, used in the alternative or used to strengthen the projected contract value of the two processes used together. As seen in FIG. 3, analysis and forecasting also may include economic scenarios and contract value and benefit base roll-up projections to develop lifetime income projections and a tradeoff and risk analysis, annuity selection.

FIG. 7 is a flowchart of a lifetime income projection engine which includes further sources of income such as social security data 705, carrier and other income data 707 (including retirement income), utilizes data from the master database in dashed line and outputs a tradeoff analyses and recommendation engine 730 for a total combined portfolio of investments, retirement and assets, FIG. 8 provides a flowchart for a tradeoff analyses and recommendation engine(s) which takes projected lifetime income, contract values and benefit-based income in a dashed box 830, client data 835, 840 and performs annuity filtering and selection 850 to find at least one recommended annuity contract of top-ranking annuities 860 and the "efficient frontier" 855 (see FIG. 18) as to what projected scenarios may influence future annual income.

FIGS. 9A through 9F show a plurality of files comprising compilations of XBRL data. FIG. 9A shows Insurance Company (carrier) and their annuity product features. FIG. 9B shows an explanation of product features of different insurance companies. FIG. 9C shows contract rider features. FIG. 9D shows withdrawal features. FIG. 9E shows rider costs. And FIG. 9F shows guaranteed roll-up. These are added to the annuity master database for each document parsed by the XBRL parser described earlier.

FIG. 10 shows sample XBRL tags which are an output of XBRL software 210 and modified software.

FIG. 11 shows a sample XBRL parser output document using, for example, a prospectus 1105 as an input to parse the prospectus 1105 and extract attributes and other key financial data for annuity calculation purposes including sentence structure and tables and outputting, for example, a summary of attributes for Guaranteed Annual Income 1110: tag, fact, period, measure, scale, decimals and balance and so on. Note that at right, a bar may be moved down by clicking and expose other attributes for guaranteed annual income. The dots at the bottom indicate one can move from a first attribute summary, for example, guaranteed annual income, to additional attribute summaries for at least three more summaries (based on the number of dots shown) than the highlighted first summary (total of four dots).

FIGS. 12 A, 12 B, 12 C, and 12 D show sample input forms for finding products that provide the most income for a given premium from a single policy, an initial premium to a joint policy with a minimum income requirement for a number of carriers (in this case, five products from four different carriers.

FIG. 13 A shows the comparison of products and guaranteed (monthly) incomes, ranked from lowest to highest. (This output shows even more products from different carriers) in rank order from lowest to highest.

FIG. 13 B is a sample report showing the premium required to deliver a desired guaranteed minimum (monthly) income, with products ranked from lowest (least premium) to highest.

FIG. 14 shows a sample report comparing the features of three of the guaranteed income products providing the highest levels of guaranteed monthly income, including type of product, rates, fees, early withdrawal charges, projected death benefits carrier credit ratings (e.g. A. M. Best) and other data. Concentration is on three products from. Global Atlantic, Lincoln Financial and Transamerica.

FIG. 17 B provides the details of projected changes to benefit base and account value based on these (externally specified) growth rates (trend lines), together with details of expenses and fees.

FIG. 18 is a graph showing an example of an efficient frontier of probability of three different, for example, variable annuity products, versus monthly income where, in this example, annuity product 'A' projects a highest monthly income at 100% probability of about $850 per month and also a highest monthly income at 85% probability of about $1125 per month. Annuity 'A' in this graph shows a decreased monthly income between 90% and 95% probability compared with annuities 'B' and 'C'.

DETAILED DESCRIPTION

Figure 2:
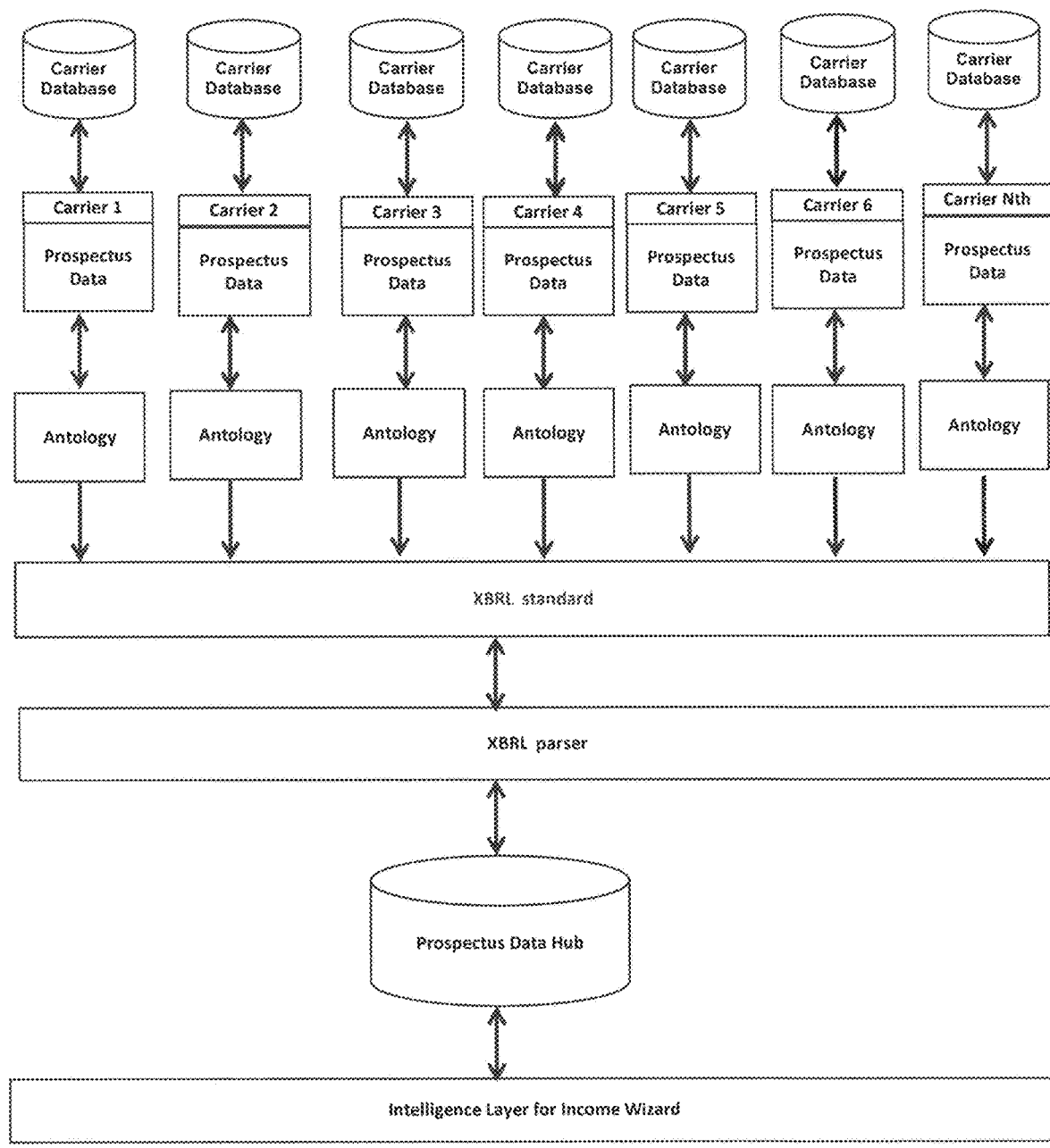
FIG. 2A is an overview of time varying financial data acquisition, parsing and conversion 210 which is also shown at the top of FIG. 1A as the process of retrieving and uploading financial data from an available prospectus, a summary document or summary or other data from a web site and updates and revisions to the financial data.
FIG. 2B through FIG. 2J provide an exhaustive explanation or series of flowcharts from prospectus data transmission (FIG. 2B) to an XBRL parser, through a modified parser and through a prospectus data hub to an intelligence layer of the cloud-based income wizard of FIG. 1A to FIG. 2J showing carrier upload of prospectus data for matching with an ontology and eventual upload into evaluation engines, also showing access by a user through a user interface to obtain at least one recommended income product or service for a customer.
Figure 2:
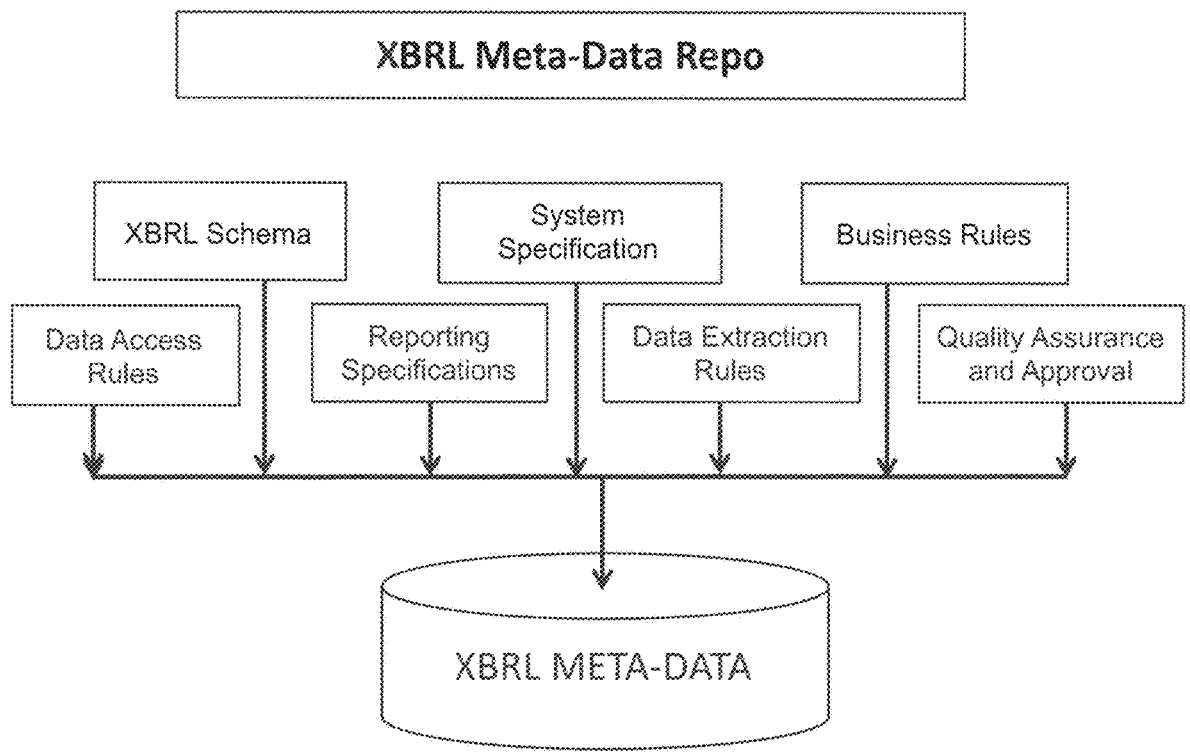
Figure 2:
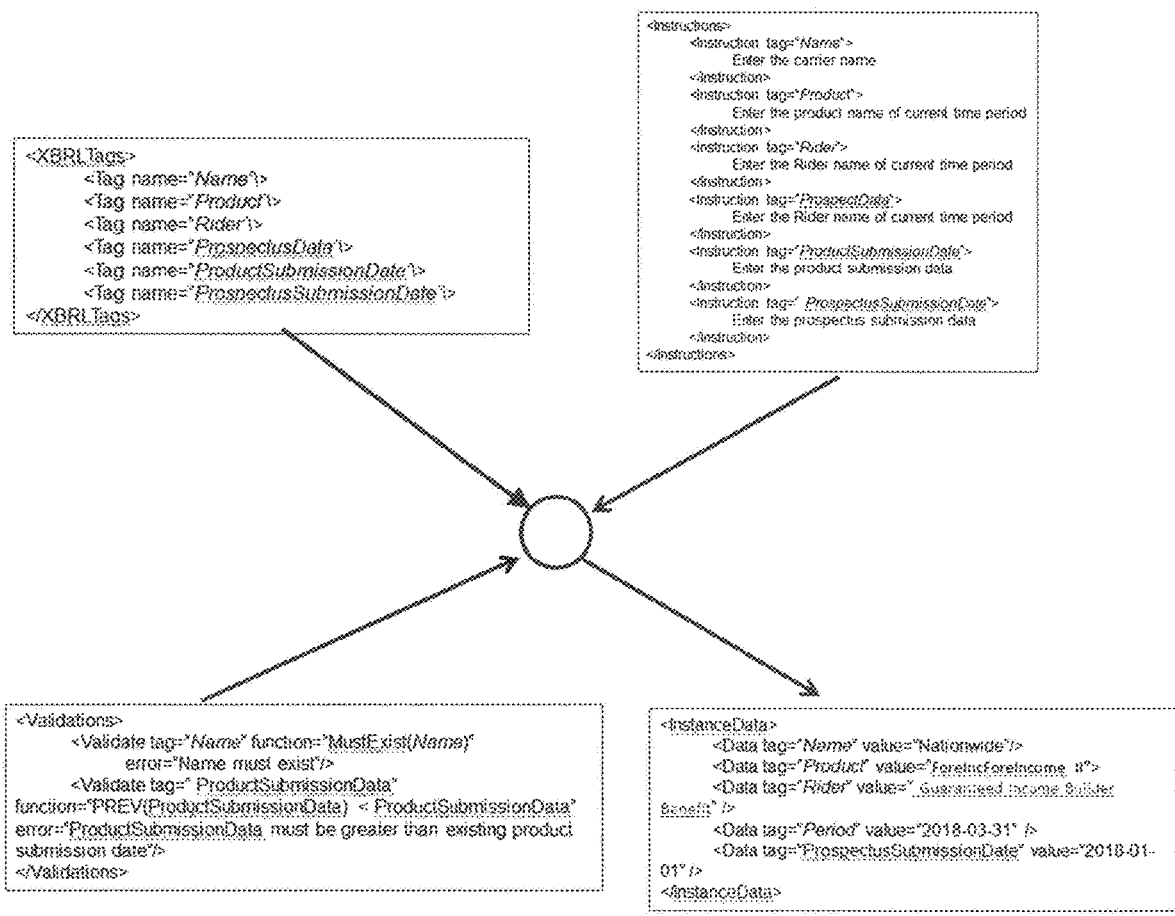
Figure 2:
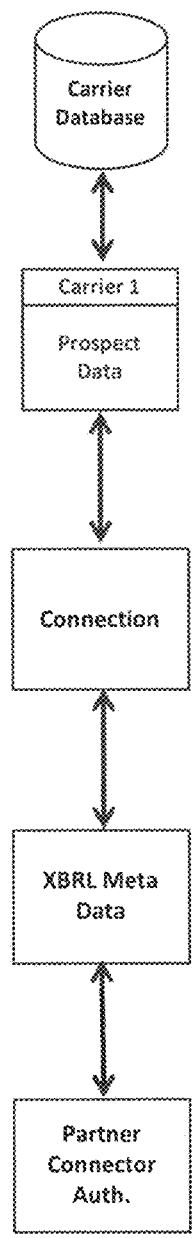
Figure 21:
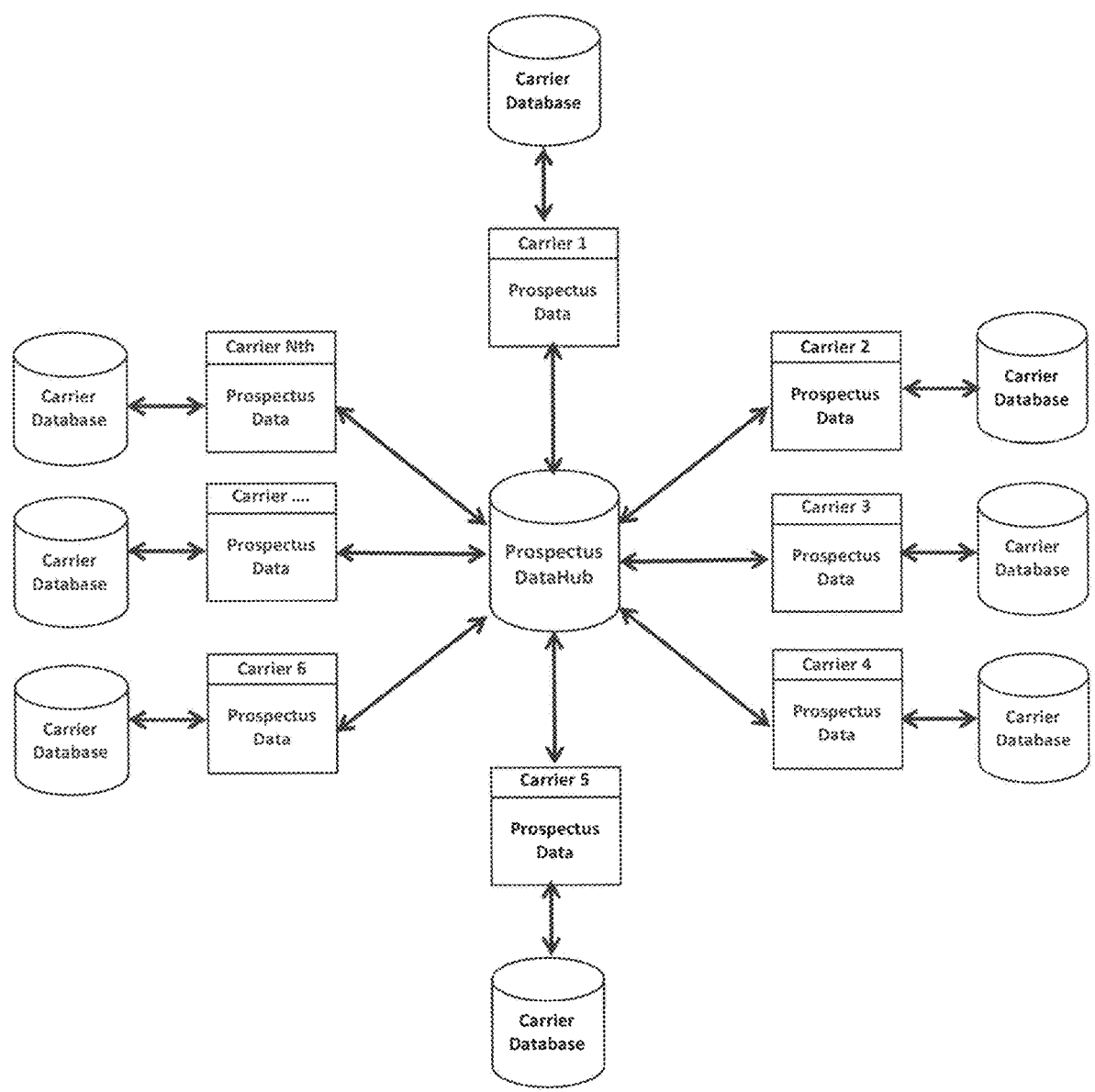

Described herein and via FIGS. 1A through 20 are processes for consolidating financial product data and evaluating, ranking and reporting the performance of guaranteed income financial products and/or services produced in regions (e.g. North America) of the world. Implementations of the processes may include business and/or automated processes for collecting product/service data from insurance carriers or other providers of such products/services, processes for standardizing terms (such as parsing algorithms) and conditions across carriers and/or categories and for regularly updating product data.

Referring briefly to FIG. 1A, these processes may span multiple classes of participants (e.g. insurance carriers, broker/dealers, advisors, insurance sales personnel, individual investors, financial analysts, regulators) and may have data flowing back and forth between these various participants. The processes may also interact with external IT systems (e.g. broker/advisor customer relations management (CRM) systems, client risk profiling software, carrier order entry systems and the like).

This patent application describes processes for comparing the key features of guaranteed income financial products, calculating the income and wealth accumulation benefits guaranteed by individual providers, and projecting the likely growth of these benefits under various market and investment scenarios with consideration of particular participant profile data. In addition, it describes processes for analyzing the potential financial risks of such products and evaluating the tradeoffs (e.g. projected income vs. likely risk or loss of income). The processes may also provide expert systems to evaluate alternatives and provide recommendations in isolation or in combination with a variety of investor/potential purchaser information, including risk preferences, estate planning, retirement data, assets and detailed health data. In some implementations several parties (e.g. carriers, investment professionals, analysts, individual investors) may carry out separate parts of these analyses in collaboration or separately.

In an implementation, the processes described herein may provide Web-based secure portal(s) that offer guaranteed income providers, sellers of such financial products (e.g. broker/dealers, insurance brokers, brokerage houses, registered representatives), financial advisors (e.g. registered investment advisers (RIAs), financial planners, CPAs), individual investors, financial analysts and regulators access to product/service features and performance evaluations. These and other users may be provided access to individual datasets or they may receive complete reports in digital form. These reports may be customized further to meet specific requirements.

The performance information and analyses may be organized into data sets and reviewed by expert(s) and/or expert systems before they are made available through the secure Web-based portal(s). Experts and expert systems may be used to evaluate the methodologies used in projections of financial performance, risk and tradeoff analysis. Expert systems also may be employed for quality assurance/quality control of guaranteed income financial product data inputs/uploads.

The processes described herein may offer access to product performance data on several levels: (1) single visual, (2) multiple visuals and (3) detailed documentation. In this regard, the processes described herein may be implemented as a stand-alone system. The processes may also be useful in combination with other software programs including, but not limited to, risk profiling and family financial planning systems.

The Web-based portals enable users to develop customized reports responsive to their needs and enable them to download product features, performance data, financial analyses and other information. Where appropriate, web-based links to these resources may be provided. Major users of this data may include, but are not limited to, insurance carriers, broker/dealers, wire houses, independent representatives, insurance agents, individual purchasers of such guaranteed income products, and regulators.

FIG. 1A shows an example of the foregoing processes conceptually. As shown in FIG. 1A, product information (e.g. guaranteed accumulation rates, income benefits, ranges of income benefits, other financial data) is obtained from various product providers such as Carriers 101 . . . 103-N. This information could include prospectuses, prospectus summaries, updates to terms and conditions, new product prospectuses, data taken from a carrier web site, advertising materials and regulatory filings. The information could be obtained from public web sites of these carriers/providers, from regulatory web sites, or from web links/APIs provided by the carriers which may be secure or insecure links.

The prospectuses and other data sources 101-1 through 105-N may include extraneous data (e.g. addresses of mutual fund providers); therefore, these data sources may be filtered via a parser (to be discussed later herein) or electronically to extract and categorize key data necessary for financial comparisons and projections. The data extracts are reviewed for completeness and accuracy (manually or electronically) and then uploaded into an Annuity Master Repository hosted at a cloud server 110. This repository 110 is versioned to (1) ensure that the most current data are available to users and (2) all prior updates to product key features can be accessed if needed (e.g. to compare prior vs. current performance).

The Annuity Master Repository 110 is the repository of all current and past terms and conditions that determine (1) the guaranteed accumulation of wealth and income/withdrawal benefits, (2) the likely performance of investments (e.g. constraints on equity/income investment ratios). This repository 110 may be accessed by participants such as insurance carriers 111, large broker/dealers, institutional analysts (such as self-side analysts 113) and regulators 112. There may be controls to limit access as well prevent unauthorized changes to the base data.

Information in the Annuity Master Repository 110 is used for generating feature comparisons (e.g. guaranteed benefit base accumulation and income/withdrawal benefit rates, expense ratios, early withdrawal penalties, insurer ratings and other features); calculate guaranteed income benefits over a prospect's (investor's) actuarial lifespan; project investments and likely income benefits; and evaluate risk and tradeoffs. This information which is also referred to as performance data, is then used to rank different products and generate recommendations via rules-based or other types of recommendation engines. The performance data may also be accessed by third parties such as broker/dealers via engine 120 (e.g. as input to proprietary recommendation software 115), carriers, consumer groups (e.g. AARP or other retiree groups), and regulators 125.

The performance data may also be presented to individual investors (annuity contract purchaser) and others via a separate web portal. This web portal may enable users to access detailed analyses, rankings based on rules-based or other types of recommendation engines. The portal may also enable users to purchase annuities online by connecting directly to a product provider (e.g. insurance carrier) or through a registered representative participating in the portal.

The performance data may also be input to external software applications which measure risk tolerance, (e.g. riskalyze.com) or provide retirement or estate planning services (e.g. RetireUp, Moneyguidepro). The performance data could be provided as a single-use report, as a regular data feed or be accessed via a tablet computer or a mobile application of a secure telecommunications device.

FIG. 1B provides a data model showing a reporting entity carrier and the collection of data for transmission on query from the WealthBook Income Wizard, cloud-based, 110, of FIG. 1A. FIG. 1C provides a carrier model for a particular carrier 1 gathering data on command of the cloud-based server of FIG. 1A including a current (or past prospectus), summary updates, a prospectus data reference manual, and other data such as validation criteria, report instructions, business rules and forms.

For convenience, these processes may be grouped into the following sets of sub-processes, namely:
 a. Data acquisition and conversion 110-1
 b. Annuity master repository 110-2
 c. Analytics and forecasting 110-3
 d. Tradeoff and risk analysis (not shown)
 e. Annuity selection (not shown)

Data Acquisition and Conversion

FIG. 2A is a simplified flowchart 210 detailing the processes used to collect, extract and standardize key product data (e.g. guaranteed accumulation and income/withdrawal rates). These processes are designed to handle the wide variations M terminology between different types of guaranteed income providers (e.g. fixed indexed annuities versus variable annuities) as well as differences in terminology between different providers within the same category. A natural language processor or parser is necessary for obtaining accurate categorization. These processes also provide for consistent review, both automated and human to ensure accuracy and completeness.

Prospectuses, prospectus summaries, updates and other product documents are converted to a standard digital format (XML) per FIG. 1A, data acquisition and conversion 110-1. Referring briefly to FIG. 2A, the converted data from these database documents are then sent to an XBRL parser 210 which inserts XBRL tags (see examples per FIG. 10). As indicated above, XBRL stands for eXtensible Business Reporting Language, a global standard for exchanging business and financial information in machine-readable form. XBRL allows the expression of semantic meaning commonly required in business reporting. The language is XML-based and uses the XML syntax. One use of XBRL is to define and exchange financial information, such as a financial statements or prospectuses. Also, as indicated above, these tags are based on an XBRL schema or ontology specifically designed and modified to interpret prospectuses, prospectus summaries and updates issued by guaranteed income product providers. There is no commonly accepted extension of the financial industry's XBRL ontology 215 to guaranteed income products. The SEC has recently (Oct. 30, 2018) asked for comment on a proposed rule for improved disclosure of variable annuities which inter alia would require the submission of information in Inline XBRL format. Refer to https://www.sec.gov/news/press-release/2018-246. Each product document (in XML) is parsed and examined for completeness at step 212. If the parser 210 has not resolved (tagged) specific terms, these are reviewed for potential changes/additions to the underlying XBRL schema and the document is parsed again. Either an XBRL document is created at 217 and published at 219 or follows path 223, 225, 215 until the process is considered complete at 223. When the document is complete, it is published as an XBRL-tagged document at 219 or 230; these documents may be used by the carriers, financial analysts or regulators.

An important benefit of XBRL tagging is the ability to consistently extract data elements that are (1) essential to compare product performance, (2) have widely varying names, and (3) are functionally equivalent when calculating the guaranteed income benefits of a given product. For example:
 GMIB (Guaranteed Minimum Income Benefit)
 GMWB (Guaranteed Minimum Withdrawal Benefit)
 Lifetime Withdrawal Benefit (LWB)

All three terms (GMIB, GMWB and LWB) essentially describe the same parameter, viz, the guaranteed rate at which a beneficiary can withdraw income from his/her annuity. There are some legal differences, but these do not affect the calculation of projected guaranteed income The XBRL schema is designed to identify such commonalities and makes it possible to extract data consistently using appropriate software. Machine extraction of key data (e.g. step 221) eliminates potential errors that arise from manual data entry and the difficulty of determining commonality between different prospectuses.

The XBRL document is then filtered to extract key product data such as the guaranteed benefit base accumulation rates, guaranteed minimum income or withdrawal benefits and so forth. The extracted product data is examined by the WealthBook Income Wizard 110 for completeness and accuracy either by an expert system or by machine learning systems. Errors/mismatches are examined for potential changes to the XBRL schema, parser or filtering algorithms.

Once the product data has been successfully extracted, it is compared with the current product data by filtering algorithms or by product review algorithms or expert system review (or both) to identify and validate the changes. These changes are analyzed further (e.g. to evaluate their effect on guaranteed benefit accumulation, income levels or other factors) and published as a report. At this point the changes in product data are committed to the annuity master repository 110-2. Here the term 'commit' is used in the context of repository management: A commit ends a transaction within a relational repository and allows all other users to see the changes.

FIG. 9A through FIG. 9F shows sample files with XBRL tags and FIG. 10 shows sample XBRL tags; these are added to the document by the XBRL parser and publication engine 210 described earlier. Each tag uniquely identifies a key data element (e.g. guaranteed income benefit) and relates it to other data elements (e.g. guaranteed accumulation benefit, time to first withdrawal). These tags make it possible to create a consistent, rules-based algorithm for extracting required data from diverse sources.

FIG. 10 shows an extract from a sample Inline XBRL prospectus document. Users can hover over values in the document to find more information about the data, such as citations and hyperlinks to the relevant accounting guidance, narrative definitions for the values, and reporting period information associated with each value.

Annuity Master Repository 110-2

This database is a cloud-based version-controlled repository of current and past key product data for guaranteed income financial products. This repository 110-2 may be accessed by carriers 111, regulators 112, financial analysts (self-side analysts 113), brokerages and others; typically, such access would be read-only, i.e., the party accessing cannot edit or change the data.

Analysis & Forecasting 110-3

To evaluate the performance of a guaranteed income product a ranking system may be used to (1) support experts (e.g. financial planners, CPAs, registered representatives) in selecting among available products, or (2) as inputs to computerized recommendation engines (e.g. rules-based recommender systems). One implementation of a ranking system is as shown below:

Level 1: Guaranteed minimum income baseline (GMI) Product data (e.g. guaranteed benefit accumulation and minimum income benefit rates, age bands, surrender charges) from the annuity master repository is combined with key beneficiary data (e.g. age at purchase, age at first withdrawal, sex) to calculate the GMI over time. Financial experts may use this data to rank and select the most appropriate product for their clients (broker/dealer recommendation engine 120).

Level 2: Projected income based on portfolio returns Additional product data (e.g. equity/income percentage limits, historical returns of funds available for investment, fund expenses) may be combined with external financial data (e.g. historical rates of return for equity classes, stock market volatility, variability of returns) to project contract value growth, changes to benefit base and guaranteed minimum income. Briefly referring to FIG. 18, these evaluations may include likelihood estimates and/or probability assessments.

Table 1 shown below is an example of how these calculations may be used to generate rankings and recommendations. Product 'A' is a guaranteed income product with a fixed benefit base growth and no participation in the growth of the underlying assets. Products 'B', 'C', and 'D' enable the investor to benefit from the growth of his/her portfolio assets.

TABLE 1

Comparing guaranteed income products
Male, 59 years, single policy, first withdrawal at age 69, premium $100,000.00

|  | Product 'A' | Product 'B' | Product 'C' | Product 'D' | Probability |
|---|---|---|---|---|---|
| Level 1: Baseline income/mo. | $850.00 | $810.00 | $785.00 | $ 750.00 | 100% |
| Rank | #1 | #2 | #3 | #4 | |
| Benefit base growth % | 10% simple | 6% simple | 5.5% comp. | 5.0% comp. | — |
| Level 2: Projected income | | | | | |
| Projected Income (hi-growth) | NA | $950.00 | $920.00 | $1,095.00 | 20% |
| Projected income (moderate-growth) | NA | $920.00 | $840.00 | $ 850.00 | 65% |
| Projected income (low-growth) | NA | $810.00 | $785.00 | $ 750.00 | 15% |

Based on Level 1 (GMI), Product 'A' would be ranked #1, while Product 'D' would be #4; with a probability of 100% (i.e. certainty). Rankings based on Level 2 (projected income) depend on (1) the likelihood or probability of the outcome and (2) the investor's risk tolerance. A conservative or low risk tolerance investor would still opt for Product 'A', and be willing to forego the chance of an additional $70 per month ($840.00 annually or $12,500,00 based on a life expectancy of 15 years) from the most likely alternative Product 'B'. A less risk-averse investor might rank the products as follows: Product 'B' followed by 'D', 'A' and 'C'; an aggressive investor might change the rankings to 'D' first, followed by 'A' and then ''D'. Risk assessment may comprise a parameter of an investor profile and a resultant recommendation be automatically determined.

FIG. 2B through FIG. 2J provide an exhaustive explanation or series of flowcharts from prospectus data transmission (FIG. 2B) to an XBRL parser, through a modified parser and through a prospectus data hub to an intelligence layer of the cloud-based income wizard of FIG. 1A to FIG. 2J showing carrier upload of prospectus data for matching with an ontology and eventual upload into evaluation engines, also showing access by a user through a user interface to obtain at least one recommended income product or service for a customer.v FIG. 3 is a flowchart of the methods and processes used to evaluate, compare and rank various guaranteed income financial products. This is organized into the following sub-processes and methods:

Level 1: GMT This process calculates the absolutely guaranteed minimum monthly income 420 each product provides for a given investment and beneficiary age etc. (See FIG. 4).

Level 2: Contract Value & Benefit Base Projections This process calculates the likely increases in benefit base and guaranteed income based on assumptions about market and fixed income returns, investment performance and product features. (See FIGS. 5 & 6 which may be utilized individually or together to improve the overall result: contract value & benefit base roll-up projections).

Level 2 (continued): Lifetime Income Projections This process combines baseline income with the various incremental income calculations based on investment results to generate likely income over the beneficiary's actuarial lifetime. (See FIG. 7).

Tradeoff & Risk Analysis, Annuity Selection This process compares different products in terms of the risks (probability of lower guaranteed income) and returns (expected or likely income). (See step 730 of FIG. 7)

Level 1 performance evaluation (GMI) is calculated using the product guarantee rates at which (1) the benefit base used for calculating guaranteed income benefits will grow, and (2) the guaranteed income benefit rates at which the beneficiary will receive income. By guaranteed income benefit, we mean either a guaranteed income benefit or a guaranteed withdrawal benefit. The guaranteed baseline income is determined by combining these two guaranteed rates with the investment amount (premium) and beneficiary-specific factors such as sex, age at time of purchase, time to first withdrawal, and single or joint policy.

FIG. 3 is organized into three columns in a dashed line box. The first column is for trend-line forecasts, assuming line forecasting, box 320. A curved line projection may be appropriate if after time, line straight line forecasting is no longer appropriate. Box 325 is for performing Monte Carlo Simulations to output contract value. Alternatively, Level 2 performance may be estimated using economic scenarios 330 per the third column. The analyst or an expert system may create alternative scenarios of economic performance over the accumulation phase (e.g. the next seven to ten years, the typical accumulation period), evaluate their impact on asset prices, and then calculate how these asset price patterns would affect step-ups, benefit base and contract value. For example, an economic scenario 330 could call for moderate growth, low volatility in stock prices and a mild recession in the middle of the accumulation phase. In turn, this could translate into asset prices growing 3% to 5% annually, with some sectors showing faster growth. The net result could be that the step-up is exercised only once and has a relatively limited impact on benefit base.

FIG. 4 is a flowchart of the processes used to calculate the GM 420. Product-specific data 410 from the annuity master repository 110 are combined with basic investor or beneficiary data 412 and actuarial lifespan table(s) 414 to generate the guaranteed benefit base and income per period (monthly/quarterly/annual) via baseline calculations 415. The result is a table of the guaranteed benefit base and monthly income 420. These calculations can be used to (1) find the product(s) which provides the maximum guaranteed income for a given investment, as well as (2) the product(s) which provides a desired level of guaranteed income at the lowest premium (investment).

FIG. 11 shows a sample XBRL parser output document using, for example, a prospectus 1105 as an input to parse the prospectus 1105 and extract attributes and other key financial data for annuity calculation purposes including sentence structure and tables and outputting, for example, a summary of attributes for Guaranteed Annual Income 1110: tag, fact, period, measure, scale, decimals and balance and so on. Note that at right, a bar may be moved down by clicking and expose other attributes for guaranteed annual income. The dots at the bottom indicate one can move from a first attribute summary, for example, guaranteed annual income, to additional attribute summaries for at least three more summaries (based on the number of dots shown) than the highlighted first summary (total of four dots).

Figure 12:
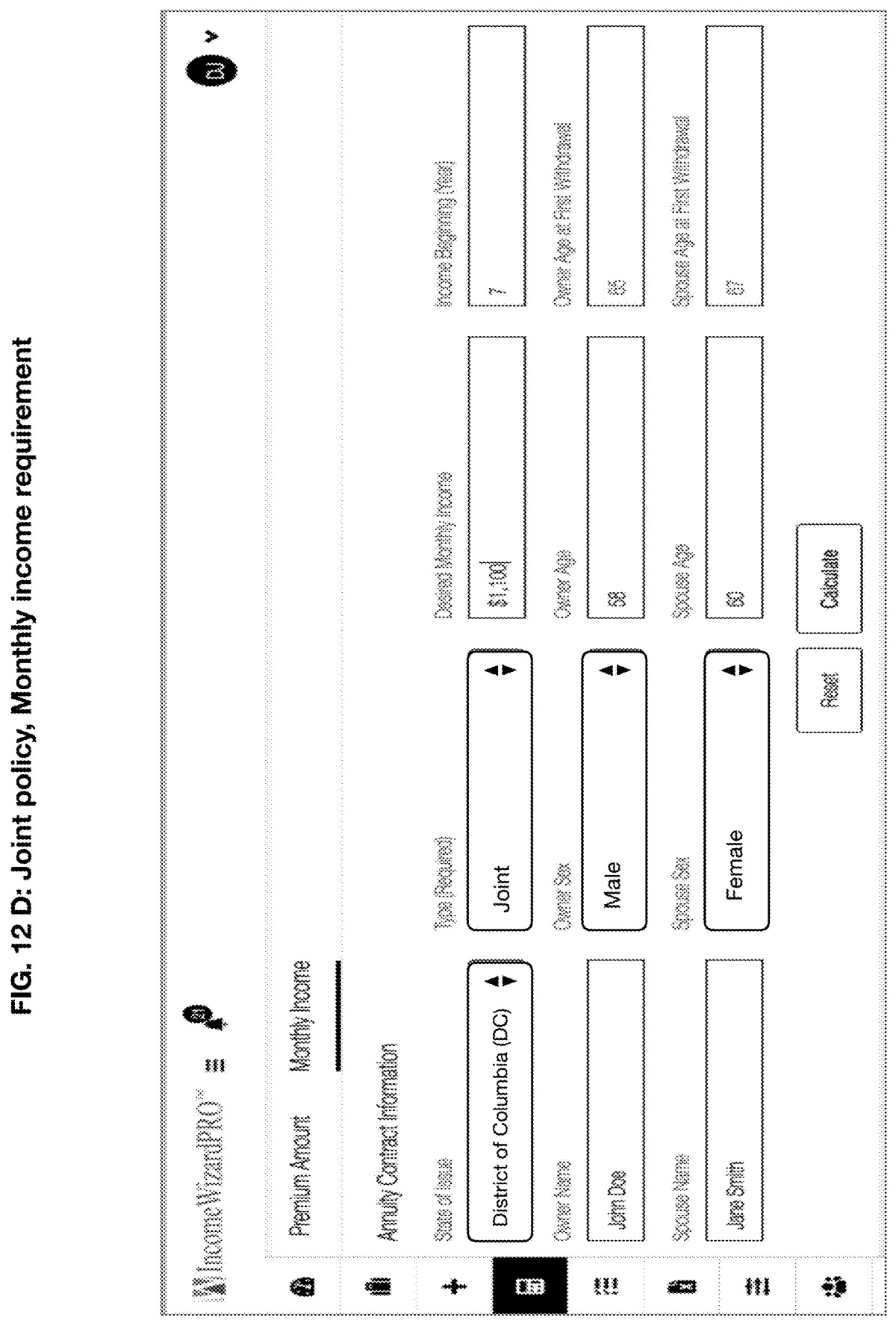

FIG. 12 A-12 B show sample output forms for finding products that provide the most income for a given premium. FIG. 12 A shows a single policy, initial premium 1200-1; FIG. 12 B shows a joint policy, initial premium 1200-2; FIG. 12 C a single policy, monthly income requirement 1200-3, and FIG. 12 D a joint policy, monthly income requirement 1200-4.

FIG. 13 A shows the comparison of products and guaranteed minimum (monthly) incomes 1305, ranked from highest to lowest, while FIG. 13 B is a sample report 1310 showing premium required to deliver a desired guaranteed minimum (monthly) income (GMI), with products ranked from lowest (least premium) to highest.

FIG. 14 shows a sample report 1400 comparing the features of three of the guaranteed income products providing the highest levels of guaranteed monthly income, including type of product, rates, fees, early withdrawal charges, projected death benefits carrier credit ratings (e.g. A. M. Best) and other data.

Figure 15:
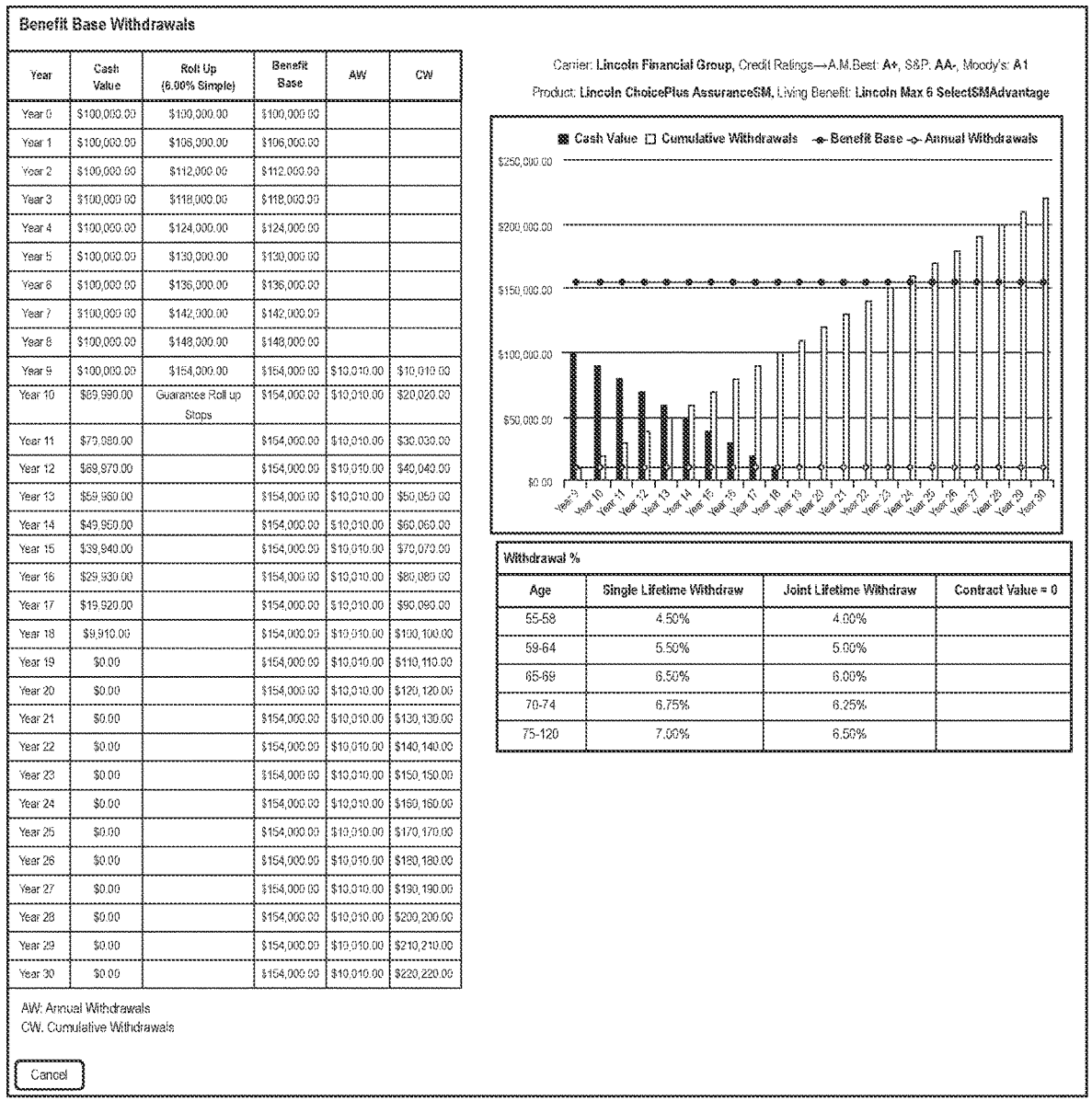
FIG. 15 shows a sample set of tables and graphs which detail how account (investment) value, benefit base, monthly income and cumulative withdrawals change over time.

FIG. 15 shows a sample set of tables and graphs 1500 which detail how account (investment) value, benefit base, monthly income and cumulative withdrawals change over time. Tables and graphs 1500 are for products with no step-ups (to be discussed below).

These outputs are generated by calculating the guaranteed minimum income (GMI) provided by all (applicable) products. Guaranteed income products such as annuities may have a minimum age for purchase. These income levels are guaranteed by the provider regardless of the performance of the underlying portfolio; there is no downside risk.

In calculating Level 2 (Projected income based on portfolio returns) performance, it may be necessary to project the likely performance of the underlying assets (e.g. equity and fixed income mutual funds, indices) in order to (1) determine whether the benefit base used for determining guaranteed income 'resets' when underlying investments grow faster than the guaranteed benefit base growth rate(s), (2) to calculate the impact of the resets on the benefit base and guaranteed income and (3) to estimate the likelihood/probability and frequency of such resets under various equity and income market conditions.

Guaranteed income products (e.g. variable and fixed indexed annuities) may have 'step-up' features by which the benefit base used for calculating guaranteed minimum withdrawals (and has a guaranteed growth rate) is reset ("stepped up") if the performance of the underlying portfolio exceeds the guaranteed minimum benefit base growth rate.

Figure 16:
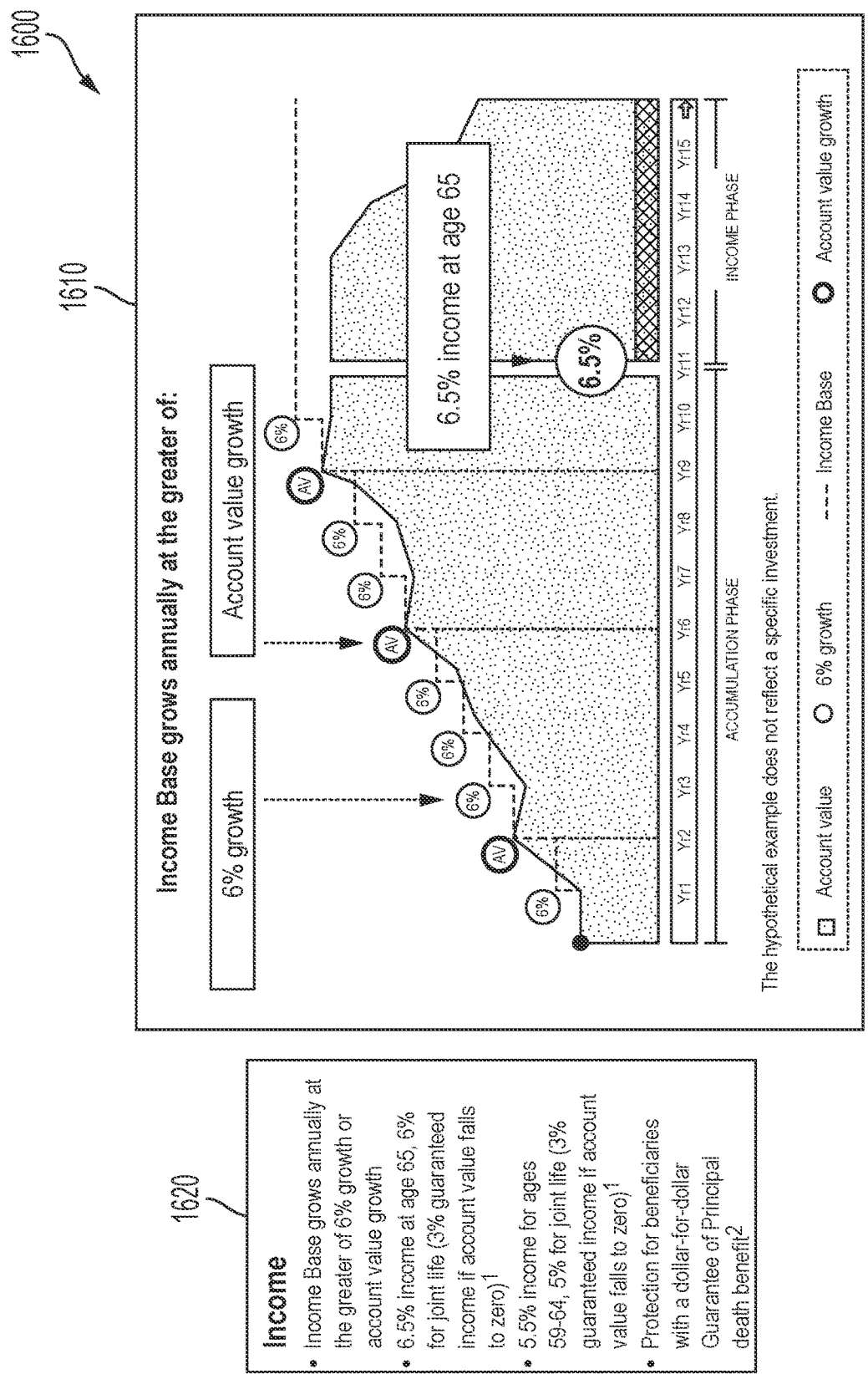
FIG. 16 shows an example of a step-up feature from Lincoln National Corporation, one of many providers of guaranteed income products in the United States, each potentially having a unique step-up feature.

FIG. 16 shows an example of such a step-up feature from Lincoln National Corporation, a large provider of guaranteed income products in the United States. In this instance:

Income Base (which is the same as a benefit base, the reference value used to calculate guaranteed minimum income benefit) grows annually at the greater of 6% growth or account value growth;

Lincoln Financial guarantees income benefits of 6.5% income at age 65, 6% for joint life (3% guaranteed income if account value falls to zero);

5.5% income for ages 59-64, 5% for joint life (3% guaranteed income if account value falls to zero).

The goal is to enable the purchasers of such guaranteed income products to capture some of the upside in the growth of their investment accounts without exposure to downside risk. In the Lincoln example shown in FIG. 16, the carrier is guaranteeing that the Income Base (the reference value used to calculate guaranteed monthly income) will never (emphasis added) drop below 6% annual growth rate, regardless of the performance of the underlying investment portfolio. At the same time, if the account value grows more than 6% in a given year, the benefit base is 'reset' to the higher of the 6% guaranteed income base and the account value. For example, assuming an initial premium of $100,000.00 if income base (at 6% simple annual growth) is $118,000 in Year 3, While the account value has grown to $125,000.00, at the start of Year 4, the benefit base is reset to $125,000.00 and is calculated to grow at 6% simple annual growth thereafter. If in Year 5, the account value declines the benefit base is still set at $125,000.00 (plus 6% annual growth). This is a simple example; the actual calculation is complicated by such factors as when the reset is calculated (e.g. at calendar year-end, contract anniversary date), how frequently (e.g. daily, quarterly, annually), fees and expenses because contract value is net of fees and expenses, is the reset stackable i.e. is the guaranteed growth rate applied to the reset amount or to the original base, and so forth.

Level 2 performance may be estimated by a variety of methods including trend-line projections (FIG. 5), Monte Carlo simulation (FIG. 6) of underlying asset prices, and economic scenarios. This application describes processes for trend-line projection (FIG. 5) and Monte Carlo simulation of asset prices (FIG. 6). The outputs of these processes may be used to generate lifetime income projections (FIG. 7) needed for Level 2 performance evaluation.

FIG. 5 is an example of a process that uses trend-line projections of the growth of the underlying account value(s) to calculate the frequency and effects of step-ups to the benefit base of a given guaranteed income product. Every period (day, month, year) (time interval N), contract value 509 is incremented based on trend lines provided by the user (financial advisor, registered representative, external digital sources) and fees and expenses 511 are deducted from contract value. The guaranteed benefit base is also increased by the guarantees provided in the product. If contract value is greater than benefit base, the benefit base is updated; if contract value is less than benefit base, there is no change to the benefit base. This process is repeated until the time of first withdrawal, at which point the calculations are stopped. The results of these calculations are then used to calculate lifetime income projections; these projections may also made available to guaranteed income providers, broker/dealers, financial analysts, and regulators.

Portfolio growth trends may be provided internally, by the registered representative(s) looking to sell the product, by analysts inside the product providers and other parties. The inputs may be straight line projections (e.g. 8.5% annual growth, not compounded) or they may be input, period by period by the user(s). This process is repeated for all the products under consideration and the output fed into the next process—lifetime income calculation (FIG. 7).

FIG. 6 is an example of an alternative approach or an additional approach to generate projections of the account values and calculate the changes to account value and benefit base. For every period (day, week, month, quarter) account values are generated randomly by a Monte Carlo price simulator 615 based on equity and income fund price history(s) 614, ratio of equity to income holdings and price volatility. In parallel, the benefit base is updated using the guaranteed benefit base growth rate 607. If contract value net of expenses and fees is greater than benefit base, benefit base is reset to contract value; otherwise not. This process is continued until the time to first withdrawal, at which point the contract value and benefit base projections are used to calculate lifetime income projections; these projections may also made available to guaranteed income providers, broker/dealers, financial analysts, and regulators.

FIG. 7 is a flowchart 700 of the processes used to calculate lifetime income projections. The benefit base and contract value projections obtained from FIGS. 5 and/or 6 are extended through the client's projected (actuarial or otherwise) life span. The client's projected lifespan may be the actuarial life span from government (e.g. Social Security 705) or other data, possibly modified by client health factors 713 (e.g. data from client questionnaire, or from health databases subject to privacy regulations such as HIPAA and client consent.) This may not be an issue if the potential investor/beneficiary were to provide health information directly.) These lifetime income projections may be modified for age bands as well as changes to income benefit rates when contract value decreases below a specified level.

Figure 17A:
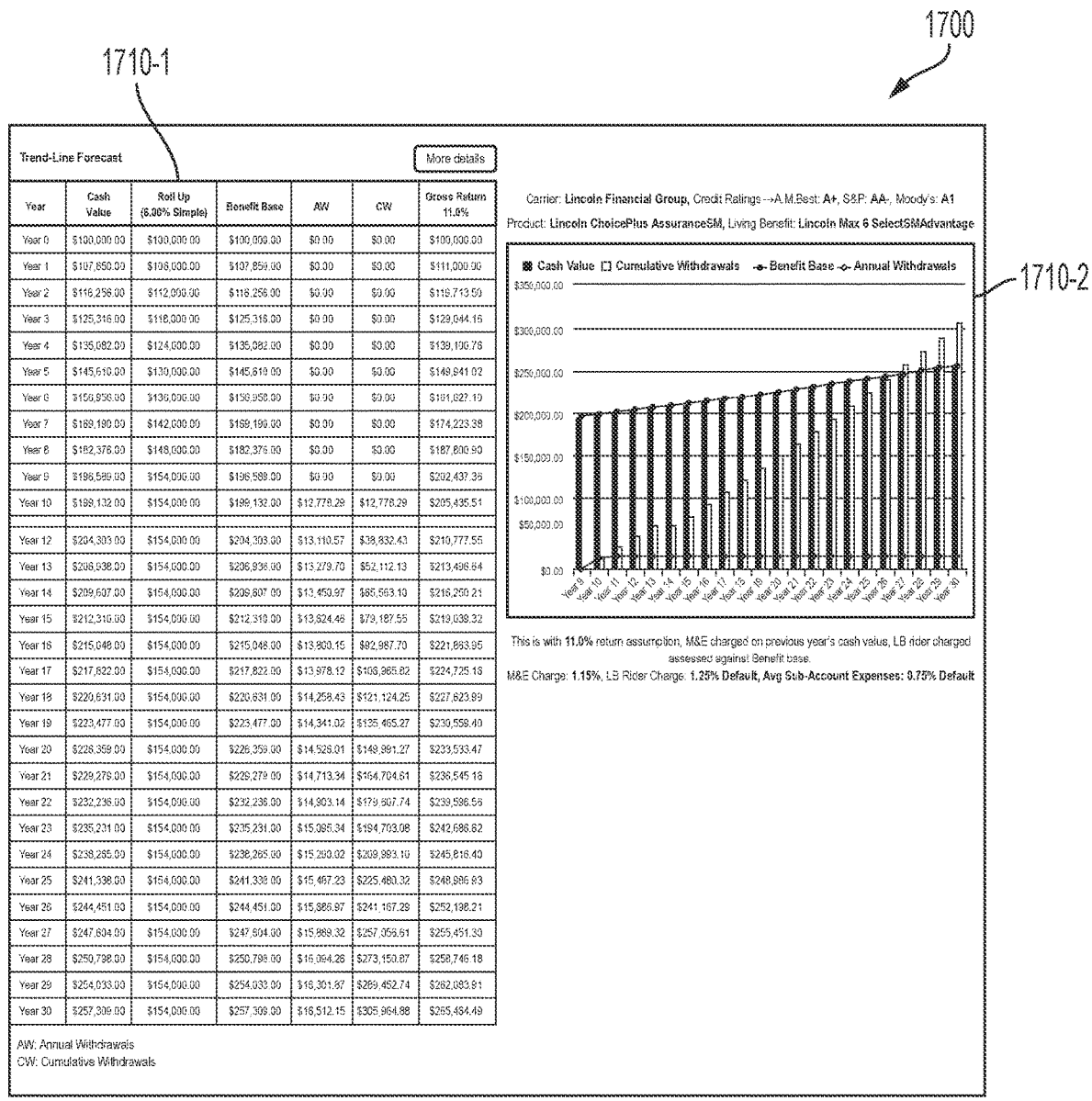
FIG. 17 A is an example of a lifetime income projection using externally specified growth trend lines. (Note that in this graph, a linear projection appears appropriate.)

FIG. 17 A is an example 1700 of a lifetime income projection using externally specified growth trend lines in the form of a listing 1710-1 and/or a graph 1710-2. FIG. 17 B provides the details of projected changes to benefit base and account value based on these (externally specified) growth rates, together with expenses and fees.

One may calculate a given annuity product's annuity return cumulative distribution function and compare guaranteed minimum income (GMI) as well as the lowest projected income which exceeds a given level of probability. For example, with a 90% level of confidence, a given guaranteed annuity product may be compared by both GMI and level of projected income. Table 2 below describes a hypothetical comparison between two annuity products A and B using this approach which has functions not available in the prior art: 1) Annuity A has GMI of $1000 per month while Annuity B has a GMI of $900 per month. Annuity A offers a higher guaranteed level of income ($100 more per month than Annuity B) but a lower level of projected monthly income ($1100 per month for annuity A versus $1250 for annuity B) at a 90% confidence level.

Another way of framing this result is as follows: "Are you comfortable taking a 10% chance you will have less (guaranteed) monthly income versus a 90% chance at making more monthly income?" A high risk averse client may choose annuity A, while most clients might agree that a 90% chance at making more money is worth the small risk that they could end up with a little less.

TABLE 2

Comparison of likely returns using confidence levels

|  | Annuity 'A' | Annuity 'B' | Difference |
|---|---|---|---|
| GMI (guaranteed monthly income) | $1,000/— | $900/— | −$100/month −$1,200/— annum −$24,000/— lifespan |
| Income with 90% confidence | $1,100/— | $1,250/— | +$150/month +$1,800/year +$36,000/— lifespan |

FIG. 18 is a graph showing an example of an efficient frontier of probability of three different, for example, variable annuity products, versus monthly income where, in this example, annuity product 'A' projects a highest monthly income at 100% probability of about $850 per month and also a highest monthly income at 85% probability of about $1125 per month. Annuity 'A' in this graph shows a decreased monthly income between 90% and 95% probability compared with annuities 'B' and 'C'

A special purpose computer system for running the above-identified method can be configured using the methods of this invention to provide services across a network to related personnel having client computers capable of connection to the network and separated by firewalls and use of RSA or other encryption from related networks, such networks comprising brokerage house networks, bank networks, insurance company networks and the like. Such services can include assistance in identification of annuity products other than those provided in house. These services can also be provided to other software, located in either in one special purpose computer system or a separate computer system connected by a network, network link, or communication interface to the present computer system or by way of the "cloud" or cloud server. The services can be protected using methods of authentication and/or encryption that are known in the fields of computer science and computer security in order to ensure data are neither compromised nor disclosed and to trace all accesses to the data. The special purpose computer system and other associated information storage and communication components can be protected using devices and methods that are known in the fields of computer science and computer security, such as with firewalls, physical access controls, power conditioning equipment, and backup or redundant power sources. The information stored by the special purpose computer system and computer-readable media can be further protected using backup or redundant information storage systems, such as those that are well-known in the art. Examples include tape storage systems and RAID storage arrays.

Figure 19:
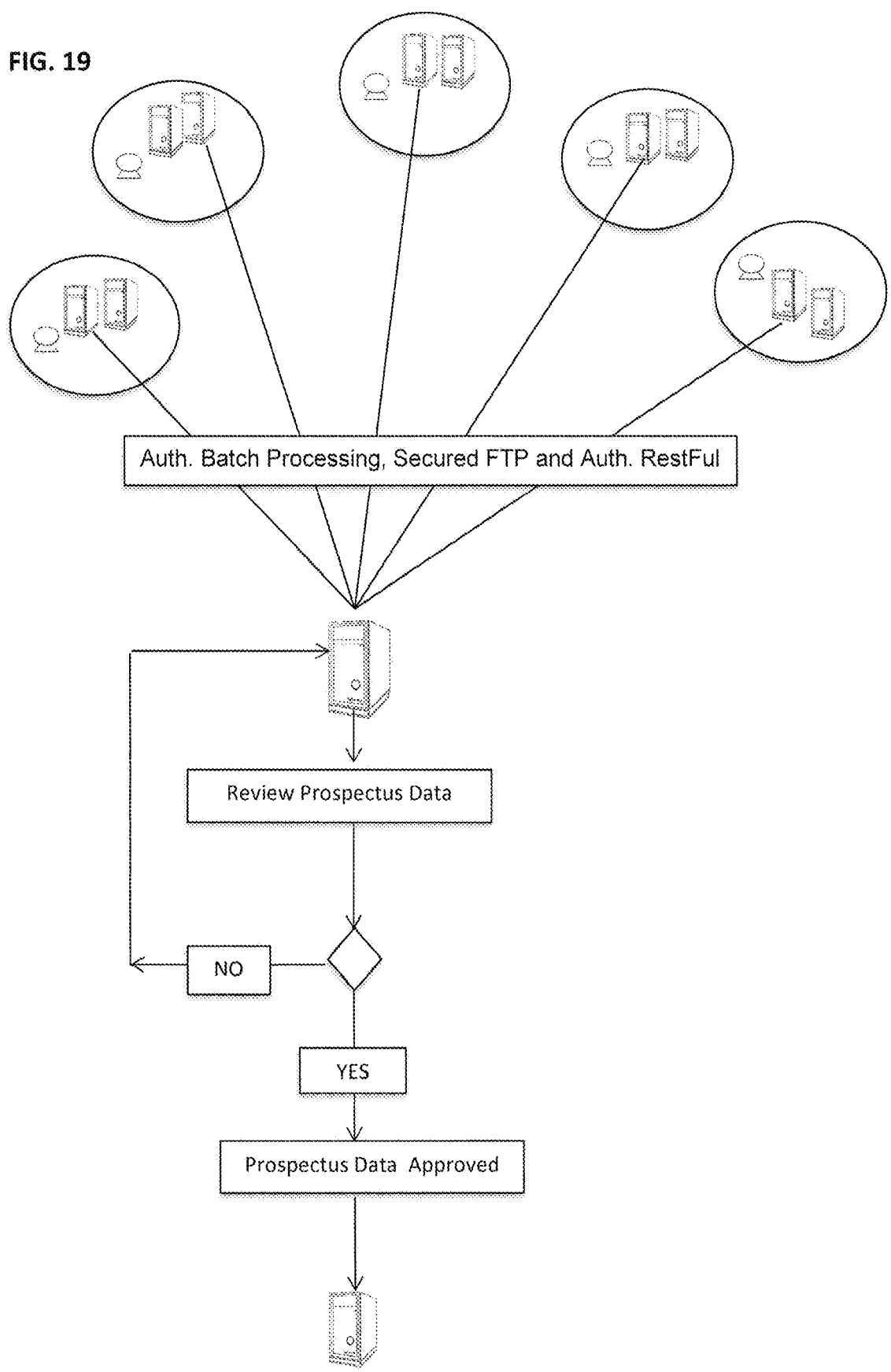
FIG. 19 provides an overview of typical client apparatus and processes for a plurality of carriers, for example, connecting at the top to a WealthBook cloud-based server for two-way communication (preferably secure communication).

FIG. 19 provides an overview of typical client apparatus and processes for a plurality of carriers, for example, connecting at the top to a WealthBook cloud-based server for two-way communication (preferably secure communication).

Figure 20:
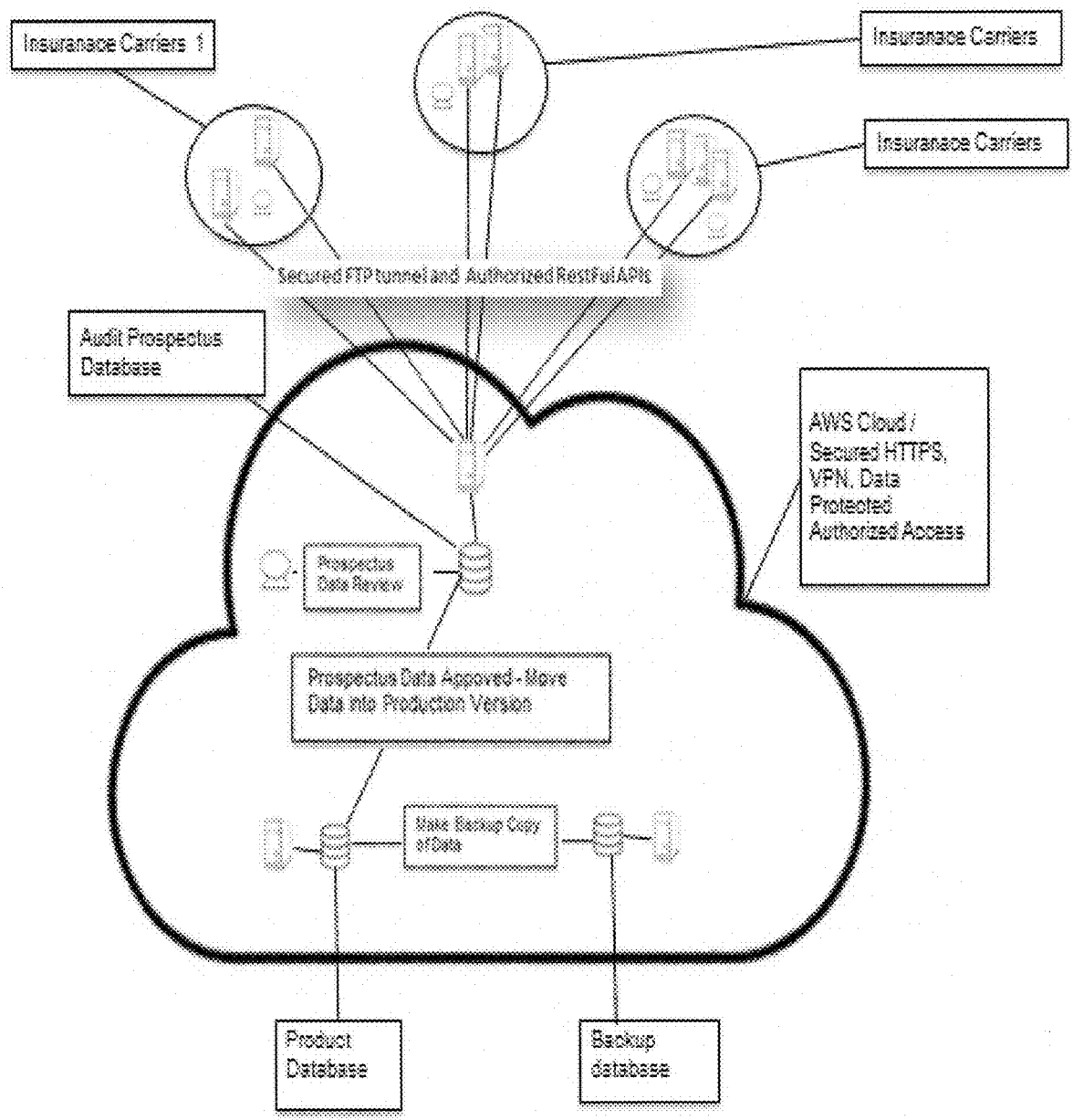
FIG. 20 provides an overview of typical server and cloud or network apparatus for the WealthBook cloud server which is very similar to FIG. 1. The intent is to show network apparatus such as insurance carrier computer apparatus being queried by a WealthBook cloud-based server for data via a secured FTP tunnel and authorized RestFul Apps. The data is reviewed, approved and moved to a product and preferably a back-up database at another geographic location.

FIG. 20 provides an overview of typical server and cloud or network apparatus for the WealthBook cloud server which is very similar to FIG. 1. The intent is to show network apparatus such as insurance carrier computer apparatus being queried by a WealthBook cloud-based server for data via a secured FTP tunnel and authorized RestFul Apps. The data is reviewed, approved and moved to a product and preferably a back-up database at another geographic location.

All patents, patent applications, and references cited in this disclosure are expressly incorporated herein by reference. What follows is an appendix describing the derivation of an equity market linked annuity expected value calculation formula.

APPENDIX

Derivation of an Equity Market Linked Annuity Expected Value Calculation Formula The following assumptions are made in deriving the expected value calculation formula: 1) Equity markets follow a normal distribution. 2) The mean is $\mu$. 3) The variance is given by $\sigma^2$ and the standard deviation is its square root $\sigma$. 4) An annuity benefit base in the case of a variable annuity or account in the case of an index annuity has a return floor of $r_{fl}$ and a ceiling of $r_{cl}$. 5) No reallocation to investment options which imply $\mu$ and $\sigma$ are constant during the deferral period. 6) The floor $r_{fl}$ and the ceiling $r_{cl}$ are also constant during the deferral period. 7) During the deferral period, there were no additional premiums paid, rider charges deducted, no premium bonus applied, no surrender, no withdrawals of any type and, thus, no surrender charges or market value adjustments applied. 8) The different fees are embedded in the market mean $\mu$. 9) The value of x is a normal variable with mean $\mu=0$ and standard deviation $\sigma=1$.

The following known formulae were used to derive the expected value calculation formula:

The probability density function for a standard normal distribution with zero mean and 1 standard deviation is given by:

$$\phi(x) = \frac{1}{\sqrt{2\pi}} e^{-\frac{x^2}{2}} \quad (1)$$

A quantile function, also called the percent-point function or inverse cumulative distribution function, provides the value of the variable at a given probability level. The function $\text{erf}^{-1}$ is the inverse of the error function erf. The quantile function for normal distribution with mean $\mu$ and variance $\sigma^2$ in error function form is given by:

$$F^{-1}(\alpha) = \mu + \sigma\sqrt{2}\,\text{erf}^{-1}(2\alpha - 1) \quad (2)$$

Where, F(x) is the cumulative distribution function.

A standard normal quantile function is applicable for a normal distribution with mean $\mu=0$ and a standard deviation $\sigma=1$ (or variance). The standard normal quantile function is given by:

$$\phi^{-1}(\alpha) = \sqrt{2}\,\text{erf}^{-1}(2\alpha - 1) \quad (3)$$

Derivation

The expected return of a market link annuity product that has a guaranteed minimum return or floor and a cap on the maximum return or ceiling is given by the definite integral function for expected return ER as:

$$ER = \frac{1}{\alpha_{cl} - \alpha_{fl}} \int_{\alpha_{fl}}^{\alpha_{cl}} F^{-1}(\alpha)d\alpha \quad \text{where} \quad (4)$$

-continued $$\alpha_{cl} = F(r_{cl}) \text{ and } \alpha_{fl} = F(r_{fl})$$

$$= \frac{1}{\alpha_{cl} - \alpha_{fl}} \int_{\alpha_{fl}}^{\alpha_{cl}} (\mu + \sigma\sqrt{2}\,\text{erf}^{-1}(2\alpha - 1)) d\alpha$$

$$= \frac{1}{\alpha_{cl} - \alpha_{fl}} \left( \int_{\alpha_{fl}}^{\alpha_{cl}} \mu d\alpha + \int_{\alpha_{fl}}^{\alpha_{cl}} \sigma\sqrt{2}\,\text{erf}^{-1}(2\alpha - 1) d\alpha \right)$$

$$= \frac{1}{\alpha_{cl} - \alpha_{fl}} \left( \alpha\mu \big|_{\alpha_{fl}}^{\alpha_{cl}} + \int_{\alpha_{fl}}^{\alpha_{cl}} \sigma\sqrt{2}\,\text{erf}^{-1}(2\alpha - 1) d\alpha \right)$$

The integral in the second term in right side of the equation (4) can be solved using substitution $\mu=2\alpha-1$ and $d\mu=2d\alpha$.

$$\int_{\alpha_{fl}}^{\alpha_{cl}} \sigma\sqrt{2}\,\text{erf}^{-1}(2\alpha - 1) d\alpha = \frac{\sigma}{\sqrt{2}} \int_{\alpha_{fl}}^{\alpha_{cl}} \text{erf}^{-1}(2\alpha - 1) 2 d\alpha \quad (5)$$

$$= \frac{\sigma}{\sqrt{2}} \int_{\alpha_{fl}}^{\alpha_{cl}} \text{erf}^{-1}(u) du$$

$$= -\frac{\sigma}{\sqrt{2}} \frac{e^{-(\text{erf}^{-1}(u))^2}}{\sqrt{\pi}} \bigg|_{\alpha_{fl}}^{\alpha_{cl}}$$

$$= -\frac{\sigma}{\sqrt{2}} \frac{e^{-\frac{1}{2}(\sqrt{2}\,\text{erf}^{-1}(2\alpha - 1))^2}}{\sqrt{\pi}} \bigg|_{\alpha_{fl}}^{\alpha_{cl}}$$

Equation 6 is the right-hand side of equation 5. Substituting Equations 1 and 3 into Equation 5 results in:

$$= -\sigma\phi(\Phi^{-1}(\alpha))\big|_{\alpha_{fl}}^{\alpha_{cl}} \quad (6)$$

Substituting Equation 6 into Equation 5 and then substituting the result into equation 4 results in:

$$ER = \frac{1}{\alpha_{cl} - \alpha_{fl}} \left( \alpha\mu - \sigma\phi(\phi^{-1}(\alpha)) \right)\big|_{\alpha_{fl}}^{\alpha_{cl}} \quad (7)$$

$$ER = \mu - \sigma \frac{(\phi(\phi^{-1}(\alpha_{cl})) - \phi(\phi^{-1}(\alpha_{fl})))}{\alpha_{cl} - \alpha_{fl}}$$

Equation 7 provides the expected return of the annuity product. The compounded returns, calculated using ER, and initial investment can be used to calculate the benefit base or account value at the end of the deferral period. This benefit base or the income calculated using the benefit base can be used to compare the annuity products (guaranteed income products).

What we claim is:

1. A method of parsing diverse documents of guaranteed income products received at a special purpose computer system from a plurality of different carriers, the diverse documents including an output product document comprising one of a prospectus, a summary of a prospectus, an update to a prospectus and a regulatory filing for a variable or non-fixed annuity published by the plurality of different carriers, the method of parsing diverse documents comprising:

receiving the diverse documents of guaranteed income products of the plurality of different carriers at a cloud-based server of the special purpose computer system and applying a natural language processor comprising an eXtensible Business Reporting Language (XBRL) parser algorithm having a data acquisition and conversion module for converting the received diverse documents to parsed documents having eXtensible Business Reporting Language tags, an annuity master database and an analytics and forecasting module, storing the eXtensible Business Reporting Language parser algorithm and at least one subsequent modification to the parser algorithm in non-transitory machine-readable storage media executable on the special purpose computer system, the special purpose computer system configured to include a cloud-based server computer of the special purpose computer system, the XBRL eXtensible Business Reporting Language parser algorithm and the at least one subsequent modification to the parser algorithm acquiring the diverse documents via a secured file transfer protocol tunnel and an authorized RestFul application from the plurality of different carriers to the cloud-based server computer, the cloud-based server categorizing like categories of annuity data comprising widely varying names, responsive to receiving the diverse documents from the plurality of different carriers for storage in the annuity master database of the cloud-based server computer, the categorization of the received diverse documents comprising:

the cloud-based server computer initially examining an output product document of the eXtensible Business Reporting Language parser algorithm for completeness, the output document being an output product document of one carrier of the plurality of different carriers, if the output product document of the one carrier is not complete having no commonly accepted extension of an eXtensible Business Reporting Language ontology for key product data of a, guaranteed income product), the cloud-based server computer reviewing an incomplete output product document for one of a potential change and an addition to underlying eXtensible Business Reporting Language schema of the eXtensible Business Reporting Language ontology and, if the output product document is complete from applying the eXtensible Business Reporting Language parser algorithm, the cloud-based server creating an eXtensible Business Reporting Language document and publishing the document as an XBRL-tagged document, the cloud-based server computer then examining the created XBRL output product document for the one carrier by the eXtensible Business Reporting Language parser algorithm, the eXtensible Business Reporting Language parser algorithm extracting at least one specific key product data item for which no specifically designed and modified tag, schema or ontology exists in the eXtensible Business Reporting Language ontology, if the created XBRL output product document is not complete having no commonly accepted extension of an eXtensible Business Reporting Language ontology and the eXtensible Business Reporting Language parser algorithm has not been modified, the cloud-based server one of making a change to or adding a tag for the at least one specific key product data item having no associated tag from the created XBRL output product document by applying an expert system and by applying a machine learning system, one of the expert system and the machine language learning program making one of a change and a tag addition to underlying eXtensible Business Reporting Language Reporting schema and making a modification to the eXtensible Business Reporting Language parser algorithm by one of a filtering process and applying a created XBRL output product document review module of the eXtensible Business Reporting Language parser algorithm, examining the created XBRL output product document again for completeness, if the created XBRL output product document is complete, the cloud-based server determining if the created eXtensible Business Reporting Language document of the one carrier compares with a current diverse document comprising one of a prospectus, an update to a prospectus and a regulatory filing by the one of the plurality of different carriers, responsive to the determining and comparison with updates, committing the completed output product to the annuity master database; and wherein one of the plurality of different carriers, a regulator and a self-side analyst having access to the committed annuity master database, the cloud-based server and the special purpose computer system, one of the cloud-based server and the special purpose computer system configured to instruct the one of the eXtensible Business Reporting Language parser algorithm and the modified eXtensible Business Reporting Language parser algorithm to instruct an analytics and forecasting module to analyze and to forecast guaranteed baseline income of insurance contract values and benefit base roll-up; filter the insurance contract values and to identify at least one recommended variable or non-fixed annuity contract available from the plurality of different carriers responsive to annuity contract purchaser profile data.

2. The method of parsing diverse documents of guaranteed income products received at a special purpose computer system from a plurality of different carriers as recited in claim 1 further comprising:

calculating a guaranteed minimum income benefit for one of a variable and a non-fixed annuity at a predetermined confidence level, and comparing first and second annuity products having different guaranteed incomes and calculating differences between guaranteed monthly income per month, per year and over the expected lifespan of a potential owner.

3. The A method of parsing diverse documents of guaranteed income products received at a special purpose computer system from a plurality of different carriers as recited in claim 1 further comprising:

determining an expected rate of return on investment in one of a variable and a non-fixed annuity at a predetermined confidence level, further considering carrier income age bands and benefit base reset rules in determining expected rate of return on investment.

4. The method of parsing diverse documents of guaranteed income products received at a special purpose computer system from a plurality of different carriers as recited in claim 1 further comprising:

forecasting an annuity contract value including one of fees and step-up terms using one of a trend-line projection and a Monte Carlo simulation, and stepping a given time interval from a number of time intervals by the given time interval to obtain one of a guaranteed benefit value and a contract value over, time and including fees and expenses.

5. The method of parsing diverse documents of guaranteed income products received at a special purpose computer system from a plurality of different carriers as recited in claim 1 further comprising:

ranking at least two of one of a variable and a non-fixed annuity according to guaranteed income benefit at a predetermined confidence level whereby a first annuity may have a greater risk as an investment than a second annuity.

6. The method of parsing diverse documents of guaranteed income products received at a special purpose computer system from a plurality of different carriers as recited in claim 1 further comprising:

receiving input contract purchased profile data comprising at least three of risk preferences, estate planning, retirement data, assets and health data, the at least three of risk preferences, estate planning, retirement data assets and health data for use by the expert system.

7. The method of parsing diverse documents of guaranteed income products received at a special purpose computer system from a plurality of different carriers as recited in claim 1 further comprising:

identifying functional equivalency by the eXtensible Business Reporting Language Parser among guaranteed minimum income benefit, guaranteed minimum withdrawal benefit and lifetime withdrawal benefit by the one of the eXtensible Business Reporting Language parser algorithm and the modified eXtensible Business Reporting Language parser algorithm of the special purpose computer system to generate tag names comprising one of Name, Product, Rider, Prospectus Data, and Product Submission Date and Prospectus and data tags comprising one of Name Value of insurance carrier name, Product value, Rider value, Period value of a date and Prospectus Submission Date value.

8. An apparatus comprising a non-transitory machine-readable storage media executable on the special purpose computer system, the special purpose computer system configured to include a cloud-based server computer configured to parse diverse documents of guaranteed income products received at the special purpose computer system from a plurality of different carriers, the diverse documents including an output product document comprising one of a prospectus, a summary of a prospectus, an update to a prospectus and a regulatory filing for a variable or non-fixed annuity published by the plurality of different carriers, the special purpose computer system configured to develop an annuity master database, the annuity master database being an output of an eXtensible Business Reporting parser algorithm of the special purpose computer system, the apparatus comprising:

a cloud-based server of the special purpose computer system comprising a data acquisition and conversion module, an annuity master database and an analytics and forecasting module of the eXtensible Business Reporting (XBRL) parser algorithm, the cloud-based sever configured to receive the diverse documents and configured to apply a natural language processor comprising an eXtensible Business Reporting Language (XBRL) parser algorithm and at least one subsequent modification to the XBRL parser algorithm in non-transitory machine-readable storage media executable on the special purpose computer system, the special purpose computer system configured to include a cloud-based server computer of the special purpose computer system;

the cloud-based server of the special purpose computer system configured to store comprising the eXtensible Business Reporting Language parser algorithm and the at least one subsequent modification in non-transitory machine-readable storage media, the cloud-based server of the special purpose computer system configured to execute the eXtensible Business Reporting Language parser algorithm and the at least one subsequent modification to the XBRL parser algorithm to extract key product data from the diverse documents of at least one carrier of the plurality of different carriers and to identify functional equivalency among different phrases in the diverse documents published by the plurality of different carriers comprising at least two of guaranteed minimum income benefit, guaranteed minimum withdrawal benefit and lifetime withdrawal benefit;

the cloud-based server of the special purpose computer system further configured to acquire the diverse documents published by the plurality of different carriers via a secured file transfer protocol tunnel and an authorized RestFul application: the eXtensible Business Reporting Language parser algorithm and the at least one subsequent modification of the XBRL parser algorithm of the cloud-based server of the special purpose computer system configured to categorize like categories of the key product data comprising widely varying names and to convert and to store the key product data with tags in the annuity master database of the cloud-based server of the special purpose computer system responsive to the eXtensible Business Reporting Language parser algorithm and the at least one subsequent modification, the cloud-based server configured to categorize the key product data and commit the key product data to the annuity master database comprising:

the cloud-based server configured to instruct the eXtensible Business Reporting Language (XBRL) parser algorithm, the cloud-based server via the XBRL parser algorithm configured to initially examine an output product document of one carrier of the plurality of different carriers for completeness, the output document being a parsed output product document of the one carrier;

if the parsed output product document of the one carrier is not complete having no commonly accepted extension of an eXtensible Business Reporting Language ontology for guaranteed income products and no resolution of tagged, specific terms, the cloud-based server configured to instruct the eXtensible Business Reporting Language parser algorithm to review the incomplete parsed output product document for one of a potential change and an addition to underlying eXtensible Business Reporting Language schema of the eXtensible Business Reporting Language ontology and making one of the potential change and addition of at least one tag to the XBRL ontology;

if the output product document of the one carrier is complete, the cloud-based server configured to create an XBRL document with XBRL tags for publication as a created XBRL tagged document; the cloud-based server computer then configured to examine the created XBRL document and to extract at least one specific key product data item for which no specially designed and modified tag, schema or ontology exists in the eXtensible Business Reporting Language ontology:

if the created XBRL product document is not complete having no commonly accepted extension of an eXtensible Business Reporting Language ontology for guaranteed income products and the eXtensible Business Reporting Language parser algorithm has not been previously modified, the cloud-based server configured to instruct the eXtensible Business Reporting Language parser algorithm to one of make a change to or add a tag for the at least one specific key product data item having no associated tag from the created XBRL output product document for which no specially designed and modified tag, schema or ontology exists in the eXtensible Business Reporting Language ontology and make a modification to the eXtensible Business Reporting Language parser algorithm by one of a filtering, of applying a created XBRL output product document review module of the eXtensible Business Reporting Language parser algorithm, of applying an expert system and of applying a machine learning system for making one of a change and a modification to the eXtensible Business Reporting Language parser algorithm;

having made one or both of a change to or addition of a tag for the at least one specific key product data item and a modification to the eXtensible Business Reporting Language parser algorithm, the cloud-based server of the special purpose computer system configured to again examine the eXtensible Business Reporting Language created XBRL product document of the one carrier for completeness;

if the created output product document is complete from the cloud-based server of the special purpose computer system applying one of the eXtensible Business Reporting Language parser algorithm and the modified eXtensible Business Reporting Language parser algorithm, the cloud-based server of the special purpose computer system instructing one of the eXtensible Business Reporting Language parser algorithm and the modified eXtensible Business Reporting Language parser algorithm to create an eXtensible Business Language Reporting Language document and to publish the document as an XBRL-tagged document;

the cloud-based server of the special purpose computer system configured to instruct the one of the eXtensible Business Reporting Language parser algorithm and the modified eXtensible Business Reporting Language parser algorithm, responsive to creating the eXtensible Business Reporting Language document, to again extract key product data from the eXtensible Business Reporting Language Reporting document for examination by one of a filtering, a product review algorithm, an expert system and a machine learning system of one of the eXtensible Business Reporting Language parser algorithm and the modified eXtensible Business Reporting Language parser algorithm for potential changes to the underlying eXtensible Business Reporting Language Reporting schema;

the cloud-based server of the special purpose computer system configured to instruct the one of the eXtensible Business Reporting Language parser algorithm and the modified eXtensible Business Reporting Language parser algorithm to make one of a change and an addition of at least one tag for extracted key data of a guaranteed income product to the XBRL ontology and to again make a modification to the XBRL parser and to repeat the creation of an XBRL document, its publication, the extraction of any key data item and examining whether the created XBRL document is not complete;

the cloud-based server of the special purpose computer system configured to instruct the one of the eXtensible Business Reporting Language parser algorithm and the modified eXtensible Business Reporting Language parser algorithm to compare the change made to at least one tag or added with any update to a prospectus or a regulatory filing by the one of the plurality of different carriers using one of filtering, a completed output product review module, an expert system and a machine learning system to identify and to validate the change or addition to assure that the change conforms to current data;

the cloud-based server of the special purpose computer system configured to instruct the one of the eXtensible Business Reporting Language parser algorithm and the modified eXtensible Business Reporting Language parser algorithm to commit the completed output product to the annuity master database; and wherein one of the plurality of different carriers, a regulator and a self-side analyst having access to the committed annuity master database, the cloud-based server and the special purpose computer system, one of the cloud-based server and the special purpose computer system configured to instruct the one of the eXtensible Business Reporting Language parser algorithm and the modified eXtensible Business Reporting Language parser algorithm to instruct an analytics and forecasting module to analyze and to forecast guaranteed baseline income of insurance contract values and benefit base roll-up; and the one of the cloud-based server and the special purpose computer system configured to filter the insurance contract values and to identify at least one recommended variable or non-fixed annuity contract available from the plurality of different carriers responsive to annuity contract purchaser profile data.

* * * * *